(12) United States Patent
Liang et al.

(10) Patent No.: US 10,554,673 B2
(45) Date of Patent: Feb. 4, 2020

(54) METHODS AND APPARATUSES FOR OBTAINING AND DELIVERING MOBILE TERMINAL SECURITY INFORMATION BASED ON A CLOUD SERVICE

(71) Applicant: Tencent Technology (Shenzhen) Company Limited, Shenzhen (CN)

(72) Inventors: Wang Liang, Shenzhen (CN); Lin Wei Bing, Shenzhen (CN); Mi Cheng Jin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 204 days.

(21) Appl. No.: 15/694,239

(22) Filed: Sep. 1, 2017

(65) Prior Publication Data

US 2017/0366567 A1   Dec. 21, 2017

Related U.S. Application Data

(63) Continuation of application No. PCT/CN2016/085798, filed on Jun. 15, 2016.

(30) Foreign Application Priority Data

Jul. 10, 2015   (CN) .......................... 2015 1 0407612

(51) Int. Cl.
*H04L 29/06* (2006.01)

(52) U.S. Cl.
CPC ...... *H04L 63/1416* (2013.01); *H04L 63/1433* (2013.01)

(58) Field of Classification Search
CPC ........ G06F 21/00; G06F 21/35; G06F 21/577; G06F 21/6218; G06F 2221/2101;
(Continued)

(56) References Cited

U.S. PATENT DOCUMENTS 9,369,433 B1 *   6/2016   Paul .................... H04L 63/0227
9,781,143 B1 *   10/2017  Song .................... H04W 4/025
(Continued)

FOREIGN PATENT DOCUMENTS

CN   102413011 A   4/2012
CN   103368904 A   10/2013
(Continued)

OTHER PUBLICATIONS

International Search Report and Written Opinion with English translations dated Aug. 24, 2016 for PCT Application No. PCT/CN2016/085798, 19 pages.
(Continued)

*Primary Examiner* — Ali S Abyaneh
*Assistant Examiner* — Shu Chun Gao
(74) *Attorney, Agent, or Firm* — Brinks Gilson & Lione

(57) ABSTRACT

Obtaining mobile terminal security information based on a cloud service includes synchronizing mobile terminal information with a cloud, receiving security information sent by the cloud, and performing corresponding security processing according to the security information. The security information is generated when the cloud determines that a security risk exists in a mobile terminal. The generated security information is sent by the cloud to the mobile terminal. Whether the security risk exists in the mobile terminal is obtained by the cloud through determining with reference to the mobile terminal information and latest security data of the cloud, and the determining step is triggered by updating of security data of the cloud.

14 Claims, 20 Drawing Sheets

(58) Field of Classification Search
CPC ... H04L 29/06; H04L 63/105; H04L 63/1416; H04L 63/1433; H04L 63/145; H04W 12/08; H04W 12/00508
See application file for complete search history.

(56) References Cited

U.S. PATENT DOCUMENTS

| | | | | |
|---|---|---|---|---|
| 10,402,546 | B1* | 9/2019 | Qureshi | G06F 21/14 |
| 2011/0167474 | A1* | 7/2011 | Sinha | G06F 21/51 726/1 |
| 2014/0026179 | A1* | 1/2014 | Devarajan | G06F 21/51 726/1 |
| 2014/0181530 | A1 | 6/2014 | Kononov et al. | |
| 2015/0135282 | A1* | 5/2015 | Kong | H04L 63/105 726/4 |
| 2015/0235329 | A1* | 8/2015 | Lu | H04W 4/21 705/319 |
| 2015/0326613 | A1* | 11/2015 | Devarajan | G06F 16/21 726/1 |
| 2016/0063243 | A1* | 3/2016 | Sridhara | G06F 21/55 726/23 |
| 2016/0099963 | A1* | 4/2016 | Mahaffey | H04L 63/0227 726/25 |
| 2016/0196132 | A1* | 7/2016 | Searle | H04L 41/082 717/173 |
| 2016/0234219 | A1* | 8/2016 | Han | H04L 63/101 |
| 2016/0308837 | A1* | 10/2016 | Baliga | H04L 63/145 |
| 2016/0344736 | A1* | 11/2016 | Khait | H04L 63/0807 |
| 2017/0163686 | A1* | 6/2017 | Diehl | H04L 63/1416 |
| 2017/0289177 | A1* | 10/2017 | Murynets | H04L 63/1433 |
| 2018/0351734 | A1* | 12/2018 | Zhao | H04L 29/06 |
| 2019/0075130 | A1* | 3/2019 | Petry | H04L 67/2814 |
| 2019/0258781 | A1* | 8/2019 | Qureshi | G06F 21/12 |

FOREIGN PATENT DOCUMENTS

| | | | | |
|---|---|---|---|---|
| CN | 103546436 | A | | 1/2014 |
| CN | 103632097 | A | | 3/2014 |
| CN | 103929323 | A * | 7/2014 | ......... H04L 63/1416 |
| CN | 104346566 | A | | 2/2015 |

OTHER PUBLICATIONS

Office Action dated Mar. 13, 2019 for Korean Application No. 10-2017-7032507, 6 pages.

Office Action with concise English translation dated Mar. 28, 2019 for Chinese Application No. 201510407612.7, 7 pages.

* cited by examiner

METHODS AND APPARATUSES FOR OBTAINING AND DELIVERING MOBILE TERMINAL SECURITY INFORMATION BASED ON A CLOUD SERVICE

CROSS-REFERENCE TO RELATED APPLICATION(S)

This application is a continuation of Patent Cooperation Treaty Patent Application No. PCT/CN2016/085798, filed on Jun. 15, 2016, which claims priority to Chinese Patent Application No. 201510407612.7, filed on Jul. 10, 2015, which are all hereby incorporated by reference in their entirety herein.

FIELD OF THE TECHNOLOGY

This application relates to the field of cloud service technologies, and in particular, to a method for obtaining mobile terminal security information based on a cloud service, a terminal, a storage medium, and to a method for delivering mobile terminal security information based on a cloud service, and a server.

BACKGROUND OF THE DISCLOSURE

With the development of mobile terminal technologies and mobile network technologies, currently, mobile terminals have become necessary tools in people's daily life, work, and entertainment.

Various types of application software providing different services are installed in a mobile terminal, and some virus software may be hidden in the various types of application software installed in the mobile terminal. As a result, security detection needs to be performed on the mobile terminal to discover virus software.

Generally, security detection on a mobile terminal is manually triggered by a user, or security detection on a mobile terminal is set to be performed when the mobile terminal starts up, or is set to be performed every once in a while, for example, once a day. In each security detection process, the mobile terminal downloads latest security data such as a latest virus database from a cloud. Further, the mobile terminal locally detects whether software included in the virus database is installed, and generates a corresponding detection report.

However, security detection cannot be performed on the mobile terminal in real time, and there is always a delay of certain duration. Therefore, security detection cannot be performed on the mobile terminal in time with reference to the latest security data. Consequently, virus software may threat information security of the mobile terminal at a time interval between two times of security detection.

SUMMARY

According to various embodiments of this application, a method for obtaining mobile terminal security information based on a cloud service, a terminal, and a storage medium are provided.

In addition, a method for delivering mobile terminal security information based on a cloud service and a server are further provided.

The method for obtaining mobile terminal security information based on a cloud service includes: synchronizing mobile terminal information of a mobile terminal with a cloud, including: sending, to the cloud, mobile terminal update information corresponding to changing of the mobile terminal information, so that the cloud updates, according to the mobile terminal update information, the mobile terminal information of the mobile terminal that is stored in the cloud; receiving security information sent by the cloud, the security information being used for describing a security risk that exists in the mobile terminal, the security information being generated when the cloud determines that the security risk exists in the mobile terminal, the generated security information being sent by the cloud to the mobile terminal, whether the security risk exists in the mobile terminal being obtained by the cloud through determining with reference to the mobile terminal information and latest security data of the cloud, the determining step being triggered by updating of security data of the cloud, the security data being used for reporting or describing software or a software behavior that may pose a security threat; and performing corresponding security processing according to the security risk that exists in the mobile terminal and that is described by the security information, to prompt a user the security risk that exists in the mobile terminal or eliminate the security risk that exists in the mobile terminal.

The method for delivering mobile terminal security information based on a cloud service includes: synchronizing mobile terminal information of a mobile terminal with the mobile terminal, including: receiving mobile terminal update information reported by the mobile terminal, and updating, according to the mobile terminal update information, the mobile terminal information of the mobile terminal that is stored in a cloud; monitoring whether security data is updated, the security data being used for reporting or describing software or a software behavior that may pose a security threat; determining, when the security data is updated, with reference to the mobile terminal information and the latest security data, whether a security risk exists in the mobile terminal; generating, when the security risk exists in the mobile terminal, security information used for describing the security risk that exists in the mobile terminal; and returning the security information to the mobile terminal, so that the mobile terminal performs corresponding security processing according to the security risk that exists in the mobile terminal and that is described by the security information, to prompt a user the security risk that exists in the mobile terminal or eliminate the security risk that exists in the mobile terminal.

The terminal includes a memory and a processor, the memory storing an instruction, where when being executed by the processor, the instruction enables the processor to perform the following steps: synchronizing mobile terminal information of a mobile terminal with a cloud, including: sending, to the cloud, mobile terminal update information corresponding to changing of the mobile terminal information, so that the cloud updates, according to the mobile terminal update information, the mobile terminal information of the mobile terminal that is stored in the cloud; receiving security information sent by the cloud, the security information being used for describing a security risk that exists in the mobile terminal, the security information being generated when the cloud determines that the security risk exists in the mobile terminal, the generated security information being sent by the cloud to the mobile terminal, whether the security risk exists in the mobile terminal being obtained by the cloud through determining with reference to the mobile terminal information and latest security data of the cloud, the determining step being triggered by updating of security data of the cloud, the security data being used for reporting or describing software or a software behavior that may pose a security threat; and performing corresponding security processing according to the security risk that exists in the mobile terminal and that is described by the security information, to prompt a user the security risk that exists in the mobile terminal or eliminate the security risk that exists in the mobile terminal.

One or more nonvolatile readable storage media that store a computer executable instruction are provided, where when being executed by one or more processors, the computer executable instruction enable the one or more processors to perform the following steps: synchronizing mobile terminal information of a mobile terminal with a cloud, including: sending, to the cloud, mobile terminal update information corresponding to changing of the mobile terminal information, so that the cloud updates, according to the mobile terminal update information, the mobile terminal information of the mobile terminal that is stored in the cloud; receiving security information sent by the cloud, the security information being used for describing a security risk that exists in the mobile terminal, the security information being generated when the cloud determines that the security risk exists in the mobile terminal, the generated security information being sent by the cloud to the mobile terminal, whether the security risk exists in the mobile terminal being obtained by the cloud through determining with reference to the mobile terminal information and latest security data of the cloud, the determining step being triggered by updating of security data of the cloud, the security data being used for reporting or describing software or a software behavior that may pose a security threat; and performing corresponding security processing according to the security risk that exists in the mobile terminal and that is described by the security information, to prompt a user the security risk that exists in the mobile terminal or eliminate the security risk that exists in the mobile terminal.

The server includes a memory and a processor, the memory storing an instruction, where when being executed by the processor, the instruction enables the processor to perform the following steps: synchronizing mobile terminal information of a mobile terminal with the mobile terminal, including: receiving mobile terminal update information reported by the mobile terminal, and updating, according to the mobile terminal update information, the mobile terminal information of the mobile terminal that is stored in a cloud; monitoring whether security data is updated, the security data being used for reporting or describing software or a software behavior that may pose a security threat; determining, when the security data is updated, with reference to the mobile terminal information and the latest security data, whether a security risk exists in the mobile terminal; and generating, when the security risk exists in the mobile terminal, security information used for describing the security risk that exists in the mobile terminal; and returning the security information to the mobile terminal, so that the mobile terminal performs corresponding security processing according to the security risk that exists in the mobile terminal and that is described by the security information, to prompt a user the security risk that exists in the mobile terminal or eliminate the security risk that exists in the mobile terminal.

Details of one or more embodiments of this application are provided in the following accompanying drawings and description. Other features, objectives, and advantages of this application become more obvious from the specification, accompanying drawings, and claims.

BRIEF DESCRIPTION OF THE DRAWINGS

To describe the technical solutions of the embodiments of this application or the existing technology more clearly, the following briefly introduces the accompanying drawings required for describing the embodiments or the existing technology. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of this application clearer, the following further describes this application in detail with reference to the accompanying drawings and embodiments. It should be understood that, specific embodiments described herein are used for explaining this application, but not used for limiting this application.

Figure 1A:
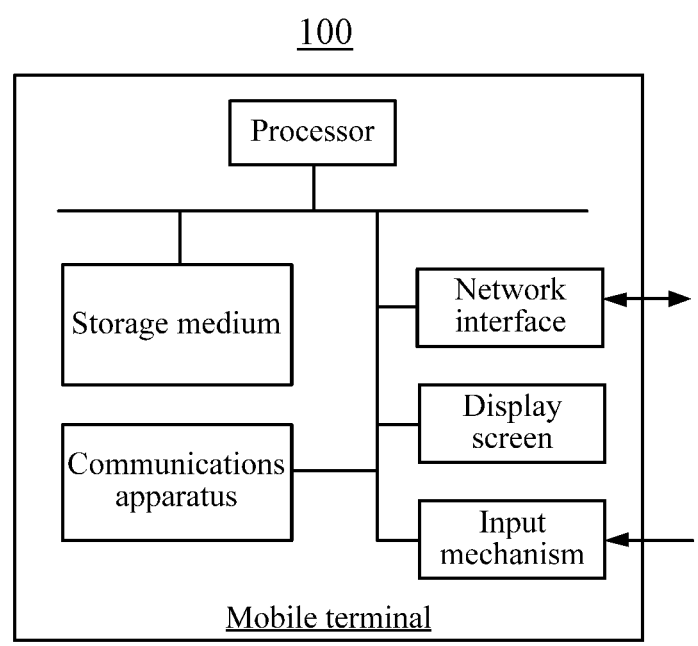
FIG. 1A is a block diagram of the structure of a part of a mobile terminal that may run a method for obtaining mobile terminal security information based on a cloud service of this application in an embodiment.

FIG. 1A is a block diagram of the structure of a part of a mobile terminal 100 that may run a method for obtaining mobile terminal security information based on a cloud service of this application in an embodiment. The mobile terminal 100 may be any terminal that may access a network, such as a mobile phone, a notebook computer, or a tablet computer. As shown in FIG. 1A, in an embodiment, the mobile terminal 100 includes a processor, a storage medium, a communications apparatus, a network interface, a display screen, and an input mechanism that are connected by using a system bus. The input mechanism triggers a related instruction according to an operation of a user, and the display screen displays the related information to the user. The communications apparatus is used for implementing call and SMS message sending and receiving functions. The network interface is used for communicating with a network. The storage medium stores software instructions used for implementing the method for obtaining mobile terminal security information based on a cloud service of this application. The storage medium is a nonvolatile readable storage medium. The storage medium runs in an internal memory for providing a running environment for the software instructions that are for implementing the method for obtaining mobile terminal security information based on a cloud service and that are in the storage medium. The processor coordinates work of all parts and executes the instructions to implement the method for obtaining mobile terminal security information based on a cloud service of this application. A person skilled in the art may understand that the structure shown in FIG. 1A is a block diagram of the structure of a part related to the solution of this application, and does not constitute a limitation to the mobile terminal 100 to which the solution of this application is applied. Specifically, the mobile terminal 100 may include more components or fewer components than those shown in the figure, or some components may be combined, or a different component deployment may be used.

Figure 1B:
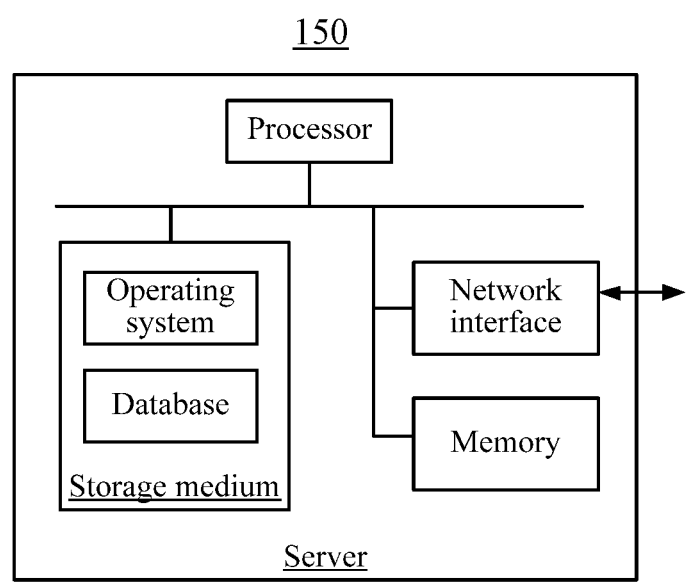
FIG. 1B is a block diagram of the structure of a part of a server that may run a method for delivering mobile terminal security information based on a cloud service of this application in an embodiment.

FIG. 1B is a block diagram of the structure of a part of a server 150 that may run a method for delivering mobile terminal security information based on a cloud service of this application in an embodiment. As shown in FIG. 1B, in an embodiment, the server 150 includes a processor, a storage medium, a memory, and a network interface that are connected by using a system bus. The network interface is used for communicating with a network. The memory is used for buffering data. The storage medium stores an operating system, a database, and software instructions used for implementing the method for delivering mobile terminal security information based on a cloud service of this application. The processor coordinates work of all parts and executes the instructions to implement the method for delivering mobile terminal security information based on a cloud service of this application. A person skilled in the art may understand that the structure shown in FIG. 1B is a block diagram of the structure of a part related to the solution of this application, and does not constitute a limitation to the server 150 to which the solution of this application is applied. Specifically, the server 150 may include more components or fewer components than those shown in the figure, or some components may be combined, or a different component deployment may be used.

Figure 2:
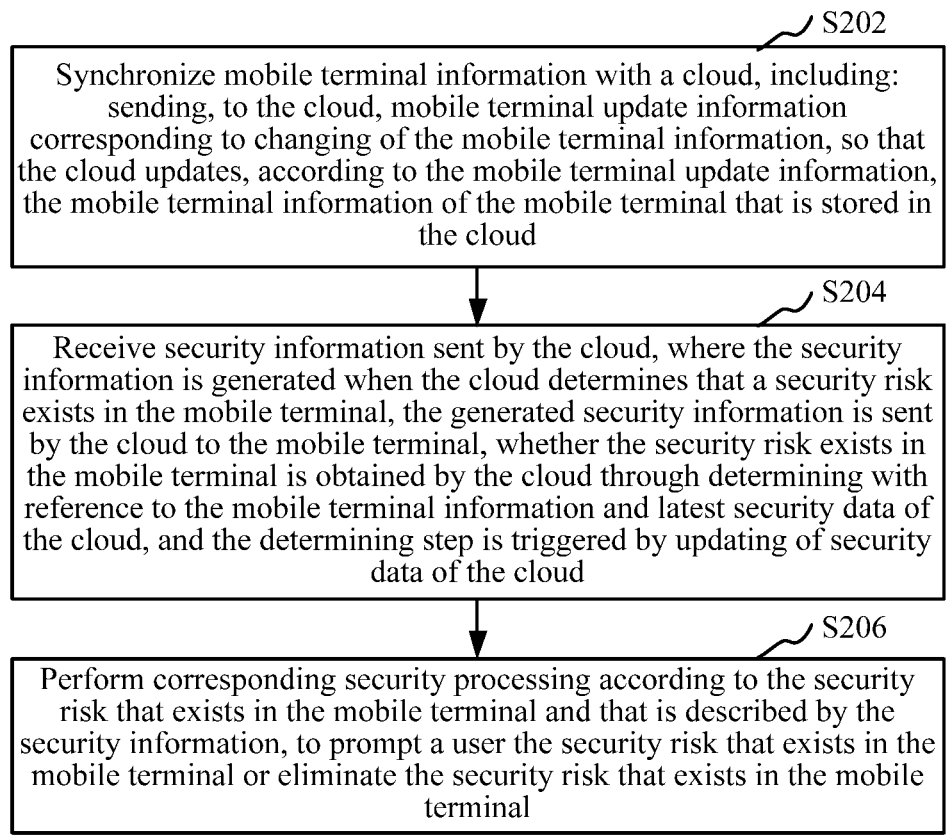
FIG. 2 is a flowchart of a method for obtaining mobile terminal security information based on a cloud service in an embodiment.

As shown by the flowchart 200 in FIG. 2, in an embodiment, a method for obtaining mobile terminal security information based on a cloud service includes the following blocks of processes:

Step S202. Synchronize mobile terminal information with a cloud, including: sending, to the cloud, mobile terminal update information corresponding to changing of the mobile terminal information, so that the cloud updates, according to the mobile terminal update information, the mobile terminal information of the mobile terminal that is stored in the cloud. The cloud may be a cloud service (e.g., described by the time sequence 350 in FIG. 3B) and/or cloud server (e.g., described by the server 150 in FIG. 1B) as described herein.

In an embodiment, if the mobile terminal has established a communication connection to the cloud, the mobile terminal sends, to the cloud in real time, the mobile terminal update information corresponding to the changing of the mobile terminal information; and if the mobile terminal has not established the communication connection to the cloud, the mobile terminal stores the mobile terminal update information corresponding to the changing of the mobile terminal information as to-be-reported mobile terminal update information, and reports the to-be-reported mobile terminal update information when the mobile terminal establishes the communication connection to the cloud.

In an embodiment, the mobile terminal information includes one or two of the following two categories of information: device information of the mobile terminal and user information corresponding to a user account that is currently logged in the mobile terminal.

In an embodiment, the device information of the mobile terminal includes a local software list of the mobile terminal, an operating system version of the mobile terminal, and/or the like.

In an embodiment, the user information corresponding to the user account that is currently logged in the mobile terminal includes one or more than two of software setting information of the mobile terminal, suspected fraud numbers specified by a user, or a geographic area of the user. The software setting information is used for representing a software behavior allowed by the user, a software behavior prohibited by the user, and/or the like.

Step S204. Receive security information sent by the cloud, where the security information is generated when the cloud determines that a security risk exists in the mobile terminal, the generated security information is sent by the cloud to the mobile terminal, whether the security risk exists in the mobile terminal is obtained by the cloud through determining with reference to the mobile terminal information and latest security data of the cloud, and the determining step is triggered by updating of security data of the cloud.

The security information is used for describing the security risk that exists in the mobile terminal.

In an embodiment, when the security data of the cloud is updated, the cloud determines, with reference to the mobile terminal information and the latest security data of the cloud, whether the security risk exists in the mobile terminal.

In an embodiment, the security information received from the cloud includes related information of one or more than two of virus software that exists in the mobile terminal, a software dangerous behavior, an operating system bug, or the like, and is used for providing a basis for security protection of the mobile terminal information. For example, the security information includes virus software related information in the local software list of the mobile terminal, dangerous software behavior related information in the local software list of the mobile terminal, information about a bug that exists in a current version of operating system of the mobile terminal, patch software corresponding to the bug, and/or the like.

In an embodiment, the security data is used for reporting or describing software or a software behavior that may pose a security threat. The software or the software behavior that may pose a security threat includes software or a software behavior that leaks user sensitive information, steals user sensitive information, modifies operating system settings, modifies software settings, and uninstalls/installs software without a user authorization.

For example, the security data may include one or more than two of virus software data software dangerous behavior data and the like.

In an embodiment, the security data of the cloud may be obtained by the cloud by means of big data analysis processing, or may be obtained by the cloud by obtaining security data provided by a third party.

Step S206. Perform corresponding security processing according to the security risk that exists in the mobile terminal and that is described by the security information, to prompt a user the security risk that exists in the mobile terminal or eliminate the security risk that exists in the mobile terminal.

In an embodiment, corresponding security processing performed according to the security risk that exists in the mobile terminal and that is described by the security information includes processing of one or more than two of the following: prompting the security information, checking and killing corresponding software according to the security information, limiting a corresponding software behavior according to the security information, and repairing a corresponding bug according to the security information.

In an embodiment, an interface or a window whose interface content includes security information may be generated, and the interface or window may be displayed, to prompt the security information.

In an embodiment, the security information includes related information of the virus software that exists in the mobile terminal. In this embodiment, the virus software prompted by the security information may be checked and killed in step S206.

In an embodiment, the security information includes related information of a dangerous software behavior that exists in the mobile terminal. In this embodiment, the dangerous software behavior prompted by the security information may be limited in step S206, for example, a dangerous behavior of corresponding software is set to a forbidden item.

In an embodiment, the security information includes related information of an operating system bug that exists in the mobile terminal. In this embodiment, a corresponding bug may be repaired according to the security information in step S206.

In the foregoing method for obtaining mobile terminal security information based on a cloud service, mobile terminal information of a mobile terminal is synchronized with a cloud, and security information sent by the cloud is received, where the security information is generated when the cloud determines that a security risk exists in the mobile terminal, the determining, by the cloud with reference to the mobile terminal information and latest security data, whether a risk exists in the mobile terminal is triggered by updating of security data of the cloud, and the generated security information is sent by the cloud to the mobile terminal. Therefore, once security data at a cloud side is updated, and when it is determined that the risk exists in the mobile terminal, the security information may be generated and sent to the mobile terminal, so that the mobile terminal can receive in time the security information generated according to the latest security data, so as to protect information security of the mobile terminal. The security information generated according to the latest security data can be obtained without initiating security detection by the mobile terminal, so that a delay in obtaining the security information can be avoided.

In an embodiment, the synchronizing mobile terminal information with a cloud in step S202 includes the following steps:

each time after the mobile terminal establishes the communication connection to the cloud, locally checking whether to-be-reported mobile terminal update information exists, and reporting the to-be-reported mobile terminal update information that exists to the cloud; and each time the mobile terminal update information changes, checking whether the mobile terminal currently establishes the communication connection to the cloud; if yes, reporting mobile terminal update information corresponding to the changing; otherwise, storing mobile terminal update information corresponding to the changing as the to-be-reported mobile terminal update information.

The mobile terminal update information may be full information of latest mobile terminal information, or may be difference information describing differences between the latest mobile terminal information and mobile terminal information when the mobile terminal update information was reported previously, including an immediate last time.

In the foregoing embodiments, the mobile terminal always reports the updated mobile terminal information to the cloud a first time after the mobile terminal information is updated, and the cloud does not report the mobile terminal information only when the cloud needs to use the mobile terminal information, thereby reducing a step of obtaining mobile terminal information from the mobile terminal by the cloud in a related processing process with reference to the mobile terminal information, and improving real-time performance of the related processing process.

In an embodiment, the mobile terminal information and the mobile terminal update information correspond to the user account that is currently logged in the mobile terminal, and in the foregoing embodiments, the to-be-reported mobile terminal update information that exists and the user account that is currently logged in the mobile terminal are correspondingly reported to the cloud.

Based on the foregoing embodiments, in an embodiment, the synchronizing mobile terminal information with a cloud in step S202 further includes the following step:

pulling, each time after the user account is logged in successfully, from the cloud, mobile terminal information corresponding to the user account that is currently logged in, and updating a local configuration according to the pulled mobile terminal information, so that the local configuration keeps consistent with the pulled mobile terminal information. In the foregoing embodiments, when a same user account is logged in different mobile terminals, the mobile terminal may pull, from the cloud, the mobile terminal information corresponding to the user account, and the mobile terminal information does not need to be specified by the user repeatedly.

In an embodiment, the mobile terminal information includes two categories of information: device information of the mobile terminal (may be referred to as device information), and user information corresponding to a user account that is currently logged in the mobile terminal (may be referred to as user information).

In this embodiment, the synchronizing mobile terminal information with a cloud in step S202 includes the following steps:

(1) Report, to the cloud at first time, each time the device information of the mobile terminal or the user information corresponding to the user account that is currently logged in the mobile terminal changes, device update information or user update information corresponding to the changing, so that the cloud updates, according to the device update information or user update information, device information or user information stored in the cloud.

In an embodiment, each time after the mobile terminal establishes the communication connection to the cloud, whether to-be-reported device update information and user update information exist may be locally checked, and the to-be-reported device update information and the user update information that exist are reported to the cloud.

Each time the device information of the mobile terminal or the user information corresponding to the user account that is currently logged in the mobile terminal changes, whether the mobile terminal currently establishes the communication connection to the cloud may be checked; if yes, device update information or user update information corresponding to the changing is reported; otherwise, device update information or user update information corresponding to the changing is stored as to-be-reported device update information or user update information.

(2) Pull, each time after the user account is logged in successfully, from the cloud, the user information corresponding to the user account that is currently logged in, and update a local configuration according to the pulled user information, so that the local configuration keeps consistent with the pulled user information.

The device update information may be full information of latest device information, or may be difference information of latest device information relative to the device information when the device update information is reported last time.

Correspondingly, the user update information may be full information of latest user information, or may be difference information of latest user information relative to the user information when the user update information is reported last time.

In the foregoing embodiments, when a same user account is logged in different mobile terminals, the mobile terminal may pull, from the cloud, the user information corresponding to the user account, and the user information does not need to be specified by the user repeatedly.

In an embodiment, in the foregoing method for obtaining mobile terminal security information based on a cloud service, the device update information and a device identifier are correspondingly reported to the cloud, and the user update information and the user account that is currently logged in are correspondingly reported to the cloud.

In an embodiment, the foregoing method for obtaining mobile terminal security information based on a cloud service further includes a step of generating a device identifier.

The method for obtaining mobile terminal security information based on a cloud service of this application is implemented by running a program instruction included in a client installed on the mobile terminal, and the step may be performed after the client is installed on the mobile terminal for the first time.

In an embodiment, the device identifier may be generated according to a globally unique identifier (GUID) of the mobile terminal.

In an embodiment, the mobile terminal information may include one of the two categories of the device information and the user information, so that the foregoing process of synchronizing the mobile terminal information with the cloud may cover a synchronization step of the device information or a synchronization step of the user information.

Figure 3A:
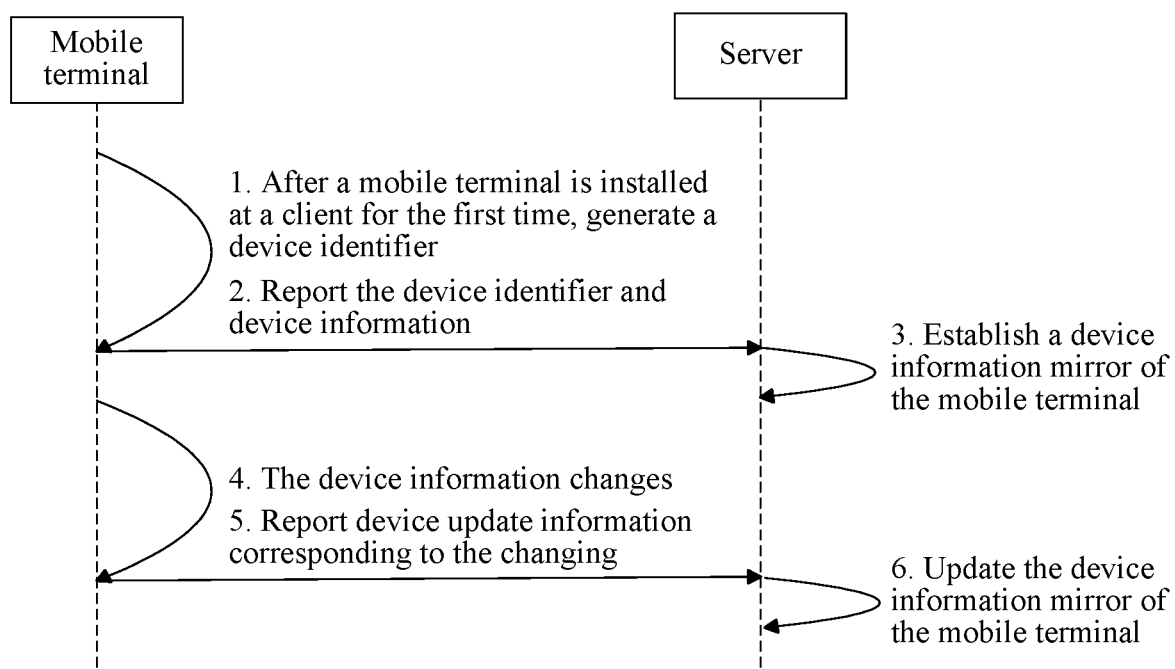
FIG. 3A is a schematic diagram of a time sequence of synchronizing device information of a mobile terminal with a cloud in an embodiment.

FIG. 3A is a schematic diagram of a time sequence 300 of synchronizing device information of a mobile terminal with a cloud in an embodiment.

As shown in FIG. 3A, in an embodiment:

1. After a mobile terminal is installed at a client for the first time, the mobile terminal generates a device identifier; and the client is a client device including a program instruction used for implementing the method for obtaining mobile terminal security information based on a cloud service of this application.

2. The mobile terminal correspondingly reports the device identifier and device information to a server of the cloud.

3. The server establishes a device information mirror of the mobile terminal. The server may correspondingly store the device identifier and the device information reported by the mobile terminal.

4. The device information of the mobile terminal changes.

5. The mobile terminal reports device update information corresponding to the changing, where
each time the device information of the mobile terminal changes, whether the mobile terminal currently establishes a communication connection to the cloud is checked; if yes, the device update information corresponding to the changing is reported; otherwise, the device update information corresponding to the changing is stored as to-be-reported device update information; and each time after the mobile terminal establishes the communication connection to the cloud, whether the to-be-reported device update information exists is locally checked, and the to-be-reported device update information that exists is reported to a server of the cloud.

6. The server of the cloud updates the device information mirror of the mobile terminal. The server may update, according to the device update information of the mobile terminal that is reported by the mobile terminal, the device information of the mobile terminal that exists in the cloud.

Figure 3B:
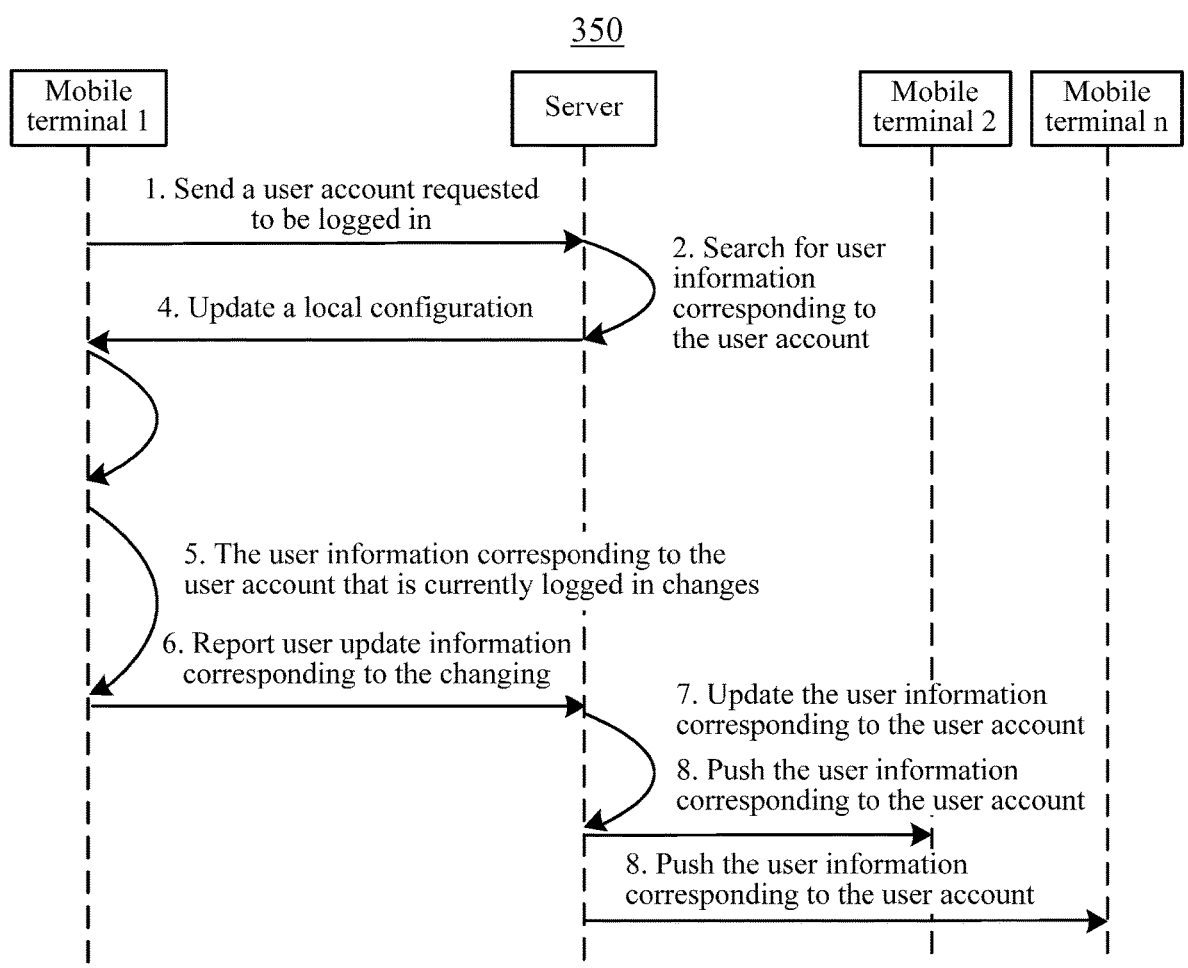
FIG. 3B is a schematic diagram of a time sequence of synchronizing user information corresponding to a user account that is currently logged in a mobile terminal with a cloud in an embodiment.

FIG. 3B is a schematic diagram of a time sequence 350 of synchronizing user information corresponding to a user account that is currently logged in a mobile terminal with a cloud in an embodiment.

As shown in FIG. 3B, in an embodiment:

1. The mobile terminal sends, to a server included in the cloud, a user account requested to be logged in.

2. The server searches for user information corresponding to the user account.

3. The server returns, to the mobile terminal, the user information corresponding to the user account. The server may perform related verification on the user account requested to be logged in, and after the verification is successful, return, to the mobile terminal, the user information corresponding to the user account.

4. The mobile terminal updates a local configuration according to the returned user information, so that the local configuration keeps consistent with the returned user information.

5. The user information corresponding to the user account that is currently logged in the mobile terminal changes.

6. The mobile terminal reports user update information corresponding to the changing, where each time the user information of the mobile terminal changes, whether the mobile terminal currently establishes a communication connection to the cloud is checked; if yes, the user update information corresponding to the changing is reported; otherwise, the user update information corresponding to the changing is stored as to-be-reported user update information; and each time after the mobile terminal establishes the communication connection to the cloud, whether the to-be-reported user update information exists is locally checked, and the to-be-reported user update information that exists is reported to the server of the cloud.

7. The server updates the user information corresponding to the user account that is currently logged in the mobile terminal.

8. The server pushes, to other mobile terminals logged in the user account, the user information corresponding to the user account.

In an embodiment, the mobile terminal information includes a local software list of the mobile terminal; and the local software list of the mobile terminal may include software information locally installed in the mobile terminal. In an embodiment, the software information may include one or more than two of a software identifier, a software name and the like. In an embodiment, the local software list of the mobile terminal may belong to the foregoing category of device information.

In an embodiment, the security data includes virus software data, where the virus software data is used for representing virus software. For example, the virus software data may include a software identifier of the virus software, or may include a software name, dangerous information, and the like of the virus software.

In an embodiment, the security information includes virus software prompt information; and the virus software prompt information is used for prompting that software that is in the local software list of the mobile terminal and that is determined by the cloud as virus software according to latest virus software data is virus software.

The virus software prompted by the virus software prompt information belongs to the virus software determined by the cloud according to the latest virus software data and belongs to software included in the local software list of the mobile terminal.

In an embodiment, updating of the virus software data of the cloud triggers generation of the virus software prompt information. When the virus software data of the cloud is updated, the cloud starts the generation of the virus software prompt information.

In the foregoing embodiments, once some software in the local software list of the mobile terminal is determined as the virus software according to the latest virus software data of the cloud, the mobile terminal may receive prompt information indicating that related software in the local software list is the virus software.

Figure 4:
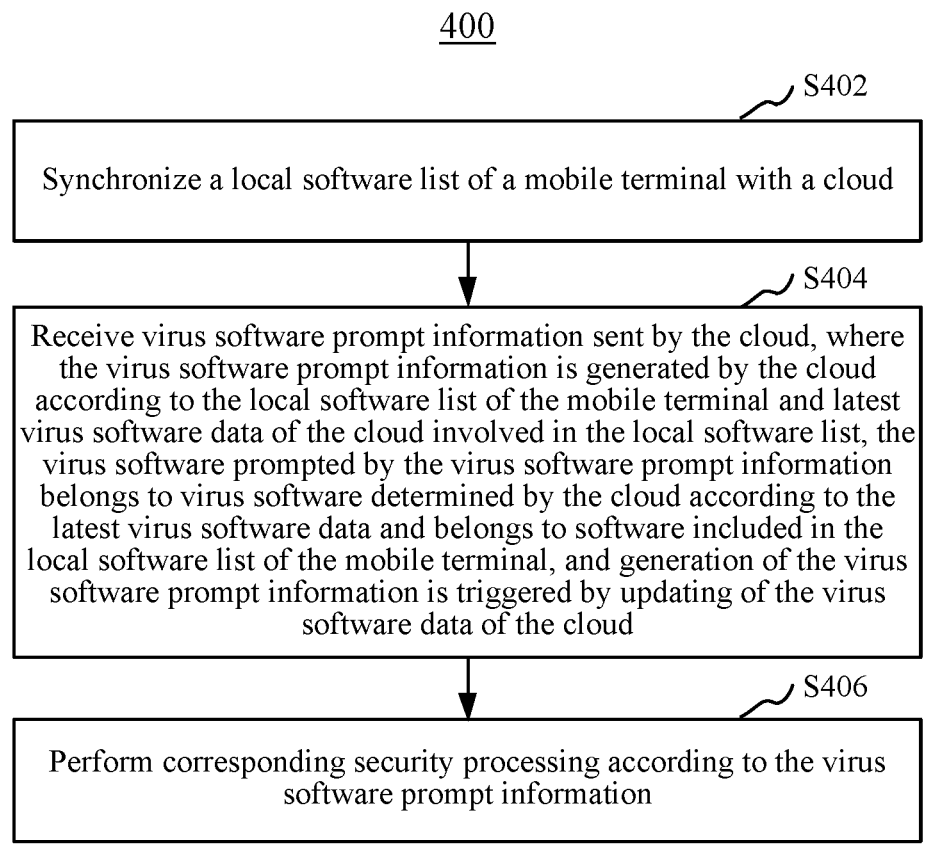
FIG. 4 is a flowchart of a process branch included in a method for obtaining mobile terminal security information based on a cloud service in an embodiment.

FIG. 4 shows a flowchart 400 of a process branch included in a method for obtaining mobile terminal security information based on a cloud service in the foregoing embodiment. As shown in FIG. 4, in an embodiment, a method for obtaining mobile terminal security information based on a cloud service includes the following steps:

Step S402. Synchronize a local software list of a mobile terminal with a cloud.

Step S404. Receive virus software prompt information sent by the cloud, where the virus software prompt information is generated by the cloud according to the local software list of the mobile terminal and latest virus software data of the cloud involved in the local software list, the virus software prompted by the virus software prompt information belongs to virus software determined by the cloud according to the latest virus software data and belongs to software included in the local software list of the mobile terminal, and generation of the virus software prompt information is triggered by updating of the virus software data of the cloud.

Step S406. Perform corresponding security processing according to the virus software prompt information.

In an embodiment, the mobile terminal information may include software setting information of the mobile terminal, where the software setting information is used for representing a software behavior allowed by a user; and the software setting information may include a software identifier of the software and a behavior identifier of the software behavior allowed by the user, and the software identifier corresponds to the behavior identifier in the software setting information. In an embodiment, the software setting information may belong to the foregoing category of user information.

The security data may include software dangerous behavior data, where the software dangerous behavior data is used for representing a dangerous software behavior; and the software dangerous behavior data may include a software identifier of the software and a behavior identifier of the dangerous software behavior, and the software identifier corresponds to the behavior identifier in the software dangerous behavior data.

The security information may include dangerous behavior prompt information used for prompting a dangerous software behavior. In an embodiment, the dangerous behavior prompt information includes related information of one or more particular behaviors of one or more pieces of software, or may include prompt information for prompting a user to perform corresponding processing on a software behavior, for example, limiting a dangerous behavior or uninstalling software.

The dangerous software behavior prompted by the dangerous behavior prompt information is represented by the software setting information as a behavior that is of corresponding software and that is allowed by the user, and is represented by the software dangerous behavior data as a dangerous behavior of the corresponding software.

In an embodiment, the generation of the dangerous behavior prompt information is triggered by the updating of the software dangerous behavior data of the cloud. When the software dangerous behavior of the cloud is updated, the cloud starts the generation of the dangerous behavior prompt information.

In the foregoing embodiments, once some behaviors that are allowed by the user and that are of some software in the software setting information of the mobile terminal are determined as dangerous behaviors of corresponding software by the latest software dangerous behavior data of the cloud, the mobile terminal may receive prompt information indicating that a corresponding behavior of corresponding software is a dangerous behavior.

Figure 5:
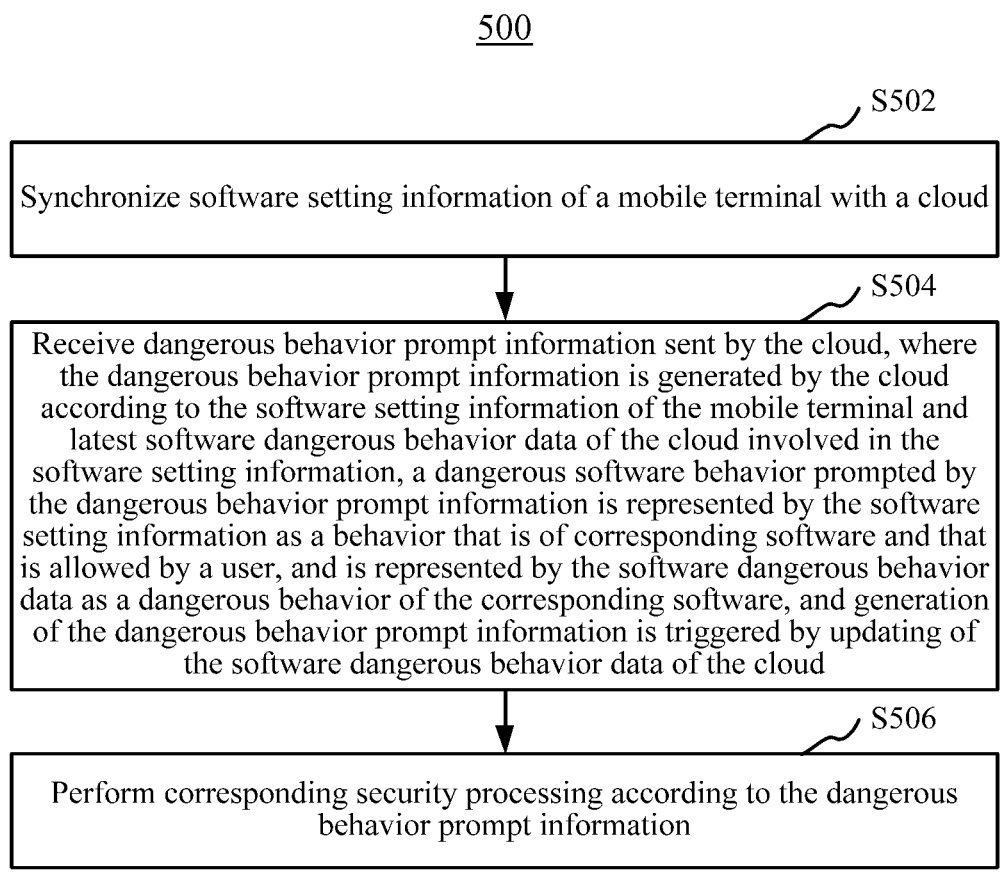
FIG. 5 is a flowchart of a process branch included in a method for obtaining mobile terminal security information based on a cloud service in another embodiment.

FIG. 5 shows a flowchart 500 of a process branch included in a method for obtaining mobile terminal security information based on a cloud service in the foregoing embodiment. As shown in FIG. 5, in an embodiment, a method for obtaining mobile terminal security information based on a cloud service includes the following steps:

Step S502. Synchronize software setting information of a mobile terminal with a cloud.

Step S504. Receive dangerous behavior prompt information sent by the cloud, where the dangerous behavior prompt information is generated by the cloud according to the software setting information of the mobile terminal and latest software dangerous behavior data of the cloud involved in the software setting information, a dangerous software behavior prompted by the dangerous behavior prompt information is represented by the software setting information as a behavior that is of corresponding software and that is allowed by a user, and is represented by the software dangerous behavior data as a dangerous behavior of the corresponding software, and generation of the dangerous behavior prompt information is triggered by updating of the software dangerous behavior data of the cloud.

Step S506. Perform corresponding security processing according to the dangerous behavior prompt information.

In an embodiment, the foregoing method for obtaining mobile terminal security information based on a cloud service further includes a process of processing a security event of a mobile terminal based on a cloud service.

Figure 6:
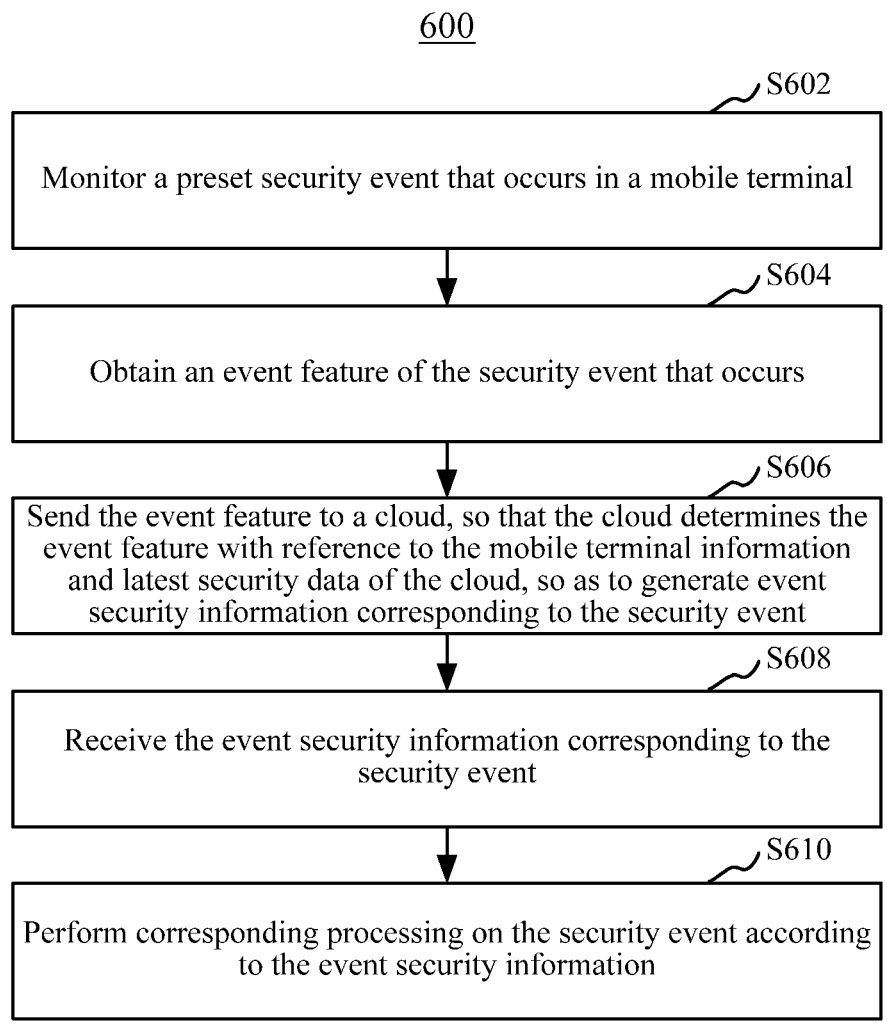
FIG. 6 is a flowchart of a process of processing a security event of a mobile terminal based on a cloud service in an embodiment.

As shown by the flowchart 600 in FIG. 6, in an embodiment, the process of processing a security event of a mobile terminal based on a cloud service includes the following steps:

Step S602. Monitor a preset security event that occurs in a mobile terminal.

In an embodiment, the preset security event may include one or more than two of a communication event and a sensitive information obtaining event for obtaining mobile terminal sensitive information.

Step S604. Obtain an event feature of the security event that occurs.

The event feature is used for representing the security event, and the event feature may include one or more than two of a program identifier of a trigger program of the security event, an event type of the security event, operation behavior information corresponding to the security event, and the like.

Step S606. Send the event feature to a cloud, so that the cloud determines the event feature with reference to the mobile terminal information and latest security data of the cloud, so as to generate event security information corresponding to the security event.

In an embodiment, the event security information may include related information of a security risk included in the security event. For example, the event security information may include prompt information indicating that a behavior executed by the security event is a dangerous behavior, or risk information of a third party related to the security event. For example, the security event is a communication event, and the event security information may include prompt information indicating that a communication number related to the communication event may be a fraud number, and the like. For another example, the security event is a payment event, the event security information may include prompt information indicating that a bonus transfer account may be a fraud account, and the like.

Step S608. Receive the event security information corresponding to the security event.

Step S610. Perform corresponding processing on the security event according to the event security information.

For example, the security event may be intercepted according to the event security information, to prevent further execution of the security event, or the event security information may be displayed or broadcast to prompt a user and monitor further operation of the user, and the like.

In the foregoing embodiments, when the security event occurs in the mobile terminal, the mobile terminal sends an event feature to the cloud, so that the cloud may generate event security information with reference to mobile terminal information and latest security data of the cloud, and the mobile terminal may perform corresponding processing on the security event according to the event security information. In the foregoing embodiments, on one hand, the mobile terminal does not need to send the mobile terminal information in real time, so as to increase the speed of returning the event security information by the cloud; on the other hand, the cloud generates the event security information with reference to the latest security data, so as to improve monitoring effectiveness of the mobile terminal for the security event.

In an embodiment, the security event may include a communication event; and the communication event may include one or more than two of a calling event, a called event, an SMS message receiving event, an SMS message sending event, and the like. A calling event of the mobile terminal is a call event initiated by the mobile terminal, and a called event of the mobile terminal is a call event initiated by another mobile terminal and answered by the mobile terminal.

The event feature of the communication event includes a communication number of the communication event. In an embodiment, the communication number of the communication event may be a communication number for communicating with the mobile terminal, for example, an SMS message sending number corresponding to an SMS receiving message event of the mobile terminal, an SMS message receiving number corresponding to an SMS message sending event of the mobile terminal, a called number corresponding to a calling event of the mobile terminal, and a calling number corresponding to a called event of the mobile terminal.

The mobile terminal information includes suspected fraud numbers specified by the user. In an embodiment, the suspected fraud numbers specified by the user may belong to the foregoing category of user information. In an embodiment, the foregoing method for obtaining mobile terminal security information based on a cloud service further includes the following steps: obtaining the suspected fraud numbers specified by the user. The suspected fraud numbers specified by the user may be obtained through a data input interface, or a suspected fraud number specified entry may be provided, and the suspected fraud numbers specified by the user are obtained from the suspected fraud number specified entry and used as the suspected fraud numbers specified by the user.

The security data may include a fraud number set. Numbers in the fraud number set are determined by the cloud as fraud numbers. The fraud number set may be obtained by the cloud by means of big data analysis processing, or may be obtained by the cloud from a third party.

The event security information may include fraud number prompt information used for prompting that the communication number is a fraud number.

The fraud number prompt information is generated by the cloud when the communication number of the communication event belongs to the suspected fraud numbers specified by the user and belongs to the numbers in the fraud number set.

Figure 7:
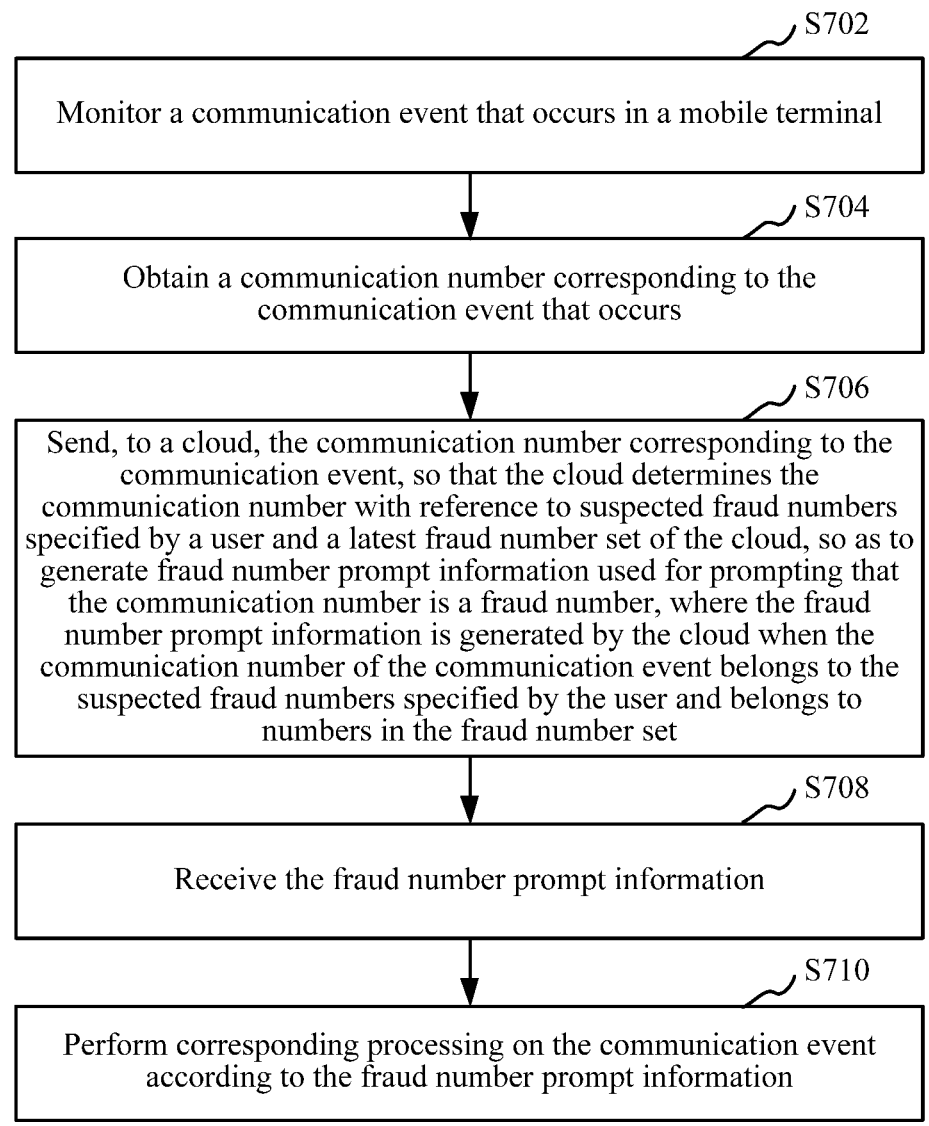
FIG. 7 is a flowchart of a process branch included in a process of processing a security event of a mobile terminal based on a cloud service in an embodiment.

FIG. 7 shows a flowchart 700 of a process branch included in a process of processing a security event of a mobile terminal based on a cloud service in the foregoing embodiment.

As shown in FIG. 7, in an embodiment, the foregoing process of processing a security event of a mobile terminal based on a cloud service includes the following steps:

Step S702. Monitor a communication event that occurs in a mobile terminal.

Step S704. Obtain a communication number corresponding to the communication event that occurs.

Step S706. Send, to a cloud, the communication number corresponding to the communication event, so that the cloud determines the communication number with reference to suspected fraud numbers specified by a user and a latest fraud number set of the cloud, so as to generate fraud number prompt information used for prompting that the communication number is a fraud number, where the fraud number prompt information is generated by the cloud when the communication number of the communication event belongs to the suspected fraud numbers specified by the user and belongs to numbers in the fraud number set.

Step S708. Receive the fraud number prompt information.

Step S710. Perform corresponding processing on the communication event according to the fraud number prompt information.

For example, the fraud number prompt information may be prompted by using a voice, text, or interface graph form. Alternatively, the communication event may be intercepted, terminated or the like according to the fraud number prompt information.

In this embodiment, the cloud may return, to the mobile terminal efficiently and in time, the fraud number prompt information indicating that the communication number corresponding to the communication event is a fraud number, so that the mobile terminal may perform timely and effective information security protection for the communication event.

In an embodiment, the security event includes a sensitive information obtaining event for obtaining mobile terminal sensitive information. In an embodiment, the mobile terminal sensitive information may include one or more than two of a root authority of an operating system of the mobile terminal, contact information stored in the mobile terminal, a current geographical location of the mobile terminal, SMS message content stored in the mobile terminal, and the like.

An event feature of the sensitive information obtaining event is used for representing a behavior of obtaining sensitive information by a trigger program of the sensitive information obtaining event. In an embodiment, the event feature of the sensitive information obtaining event includes a program identifier of the trigger program of the sensitive information obtaining event and behavior information corresponding to the sensitive information obtaining event, for example, a behavior category or a behavior identifier. The behavior information may include the sensitive information obtained by the sensitive information obtaining event.

The mobile terminal information may include software setting information of the mobile terminal, where the software setting information is used for representing a software behavior allowed by the user; and the software setting information may include a software identifier of the software and a behavior identifier of the software behavior allowed by the user, and the software identifier corresponds to the behavior identifier in the software setting information.

The security data may include software dangerous behavior data, where the software dangerous behavior data is used for representing a dangerous software behavior; and the software dangerous behavior data may include a software identifier of the software and a behavior identifier of the dangerous software behavior, and the software identifier corresponds to the behavior identifier in the software dangerous behavior data.

The event security information includes dangerous event prompt information used for prompting that a behavior corresponding to the sensitive information obtaining event is a dangerous behavior.

The dangerous event prompt information is generated by the cloud when the following condition is met: the behavior corresponding to the sensitive information obtaining event is represented by the software setting information as a behavior that is of the trigger program and that is allowed by the user, and is represented by the software dangerous behavior data as a dangerous behavior of the trigger program.

Figure 8:
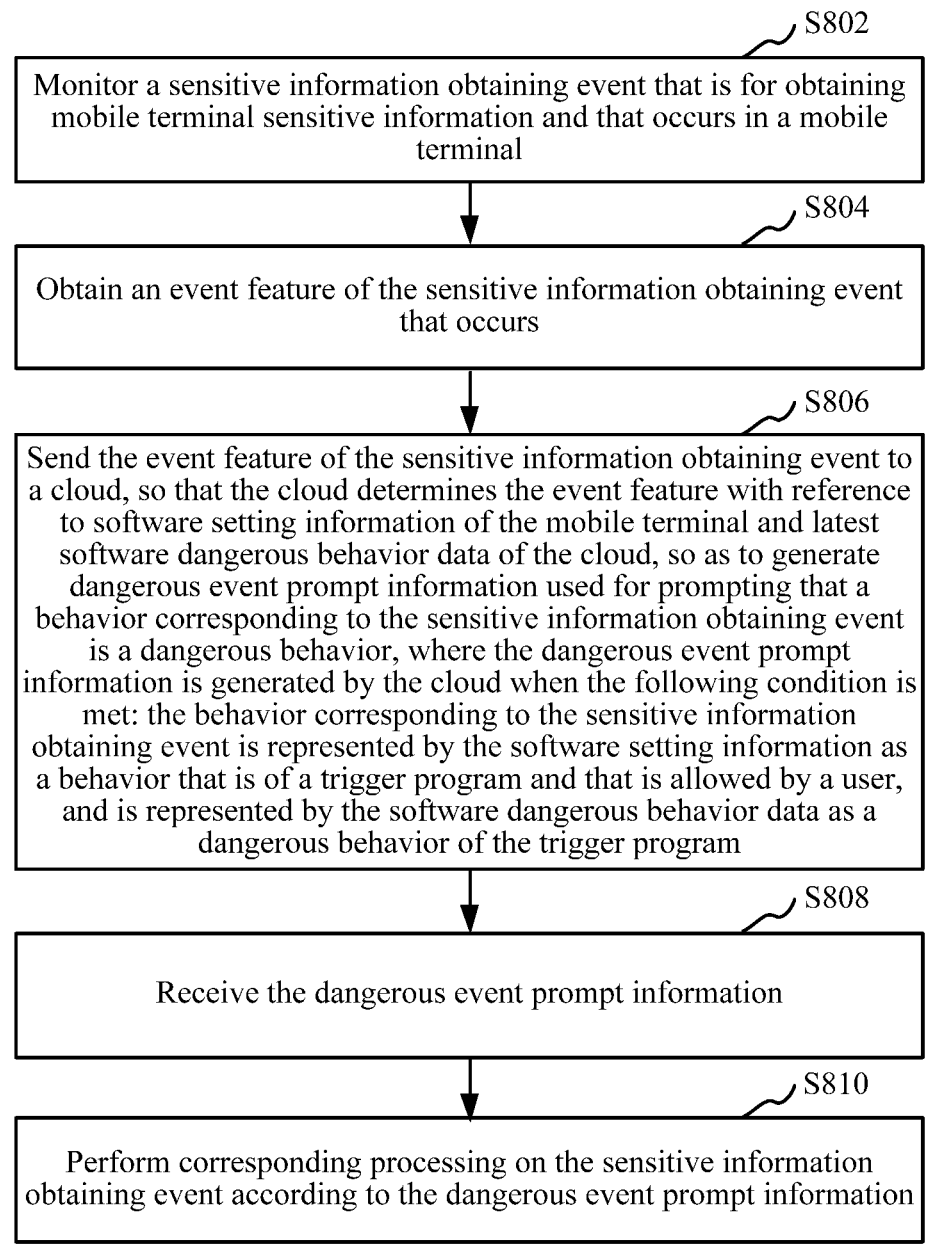
FIG. 8 is a schematic diagram of a process branch included in a process of processing a security event of a mobile terminal based on a cloud service in another embodiment.

FIG. 8 shows a flowchart 800 of a process branch included in a process of processing a security event of a mobile terminal based on a cloud service in the foregoing embodiment;

As shown in FIG. 8, in an embodiment, the foregoing process of processing a security event of a mobile terminal based on a cloud service includes the following steps:

Step S802. Monitor a sensitive information obtaining event that is for obtaining mobile terminal sensitive information and that occurs in a mobile terminal.

Step S804. Obtain an event feature of the sensitive information obtaining event that occurs.

Step S806. Send the event feature of the sensitive information obtaining event to a cloud, so that the cloud determines the event feature with reference to software setting information of the mobile terminal and latest software dangerous behavior data of the cloud, so as to generate dangerous event prompt information used for prompting that a behavior corresponding to the sensitive information obtaining event is a dangerous behavior, where the dangerous event prompt information is generated by the cloud when the following condition is met: the behavior corresponding to the sensitive information obtaining event is represented by the software setting information as a behavior that is of a trigger program and that is allowed by a user, and is represented by the software dangerous behavior data as a dangerous behavior of the trigger program.

Step S808. Receive the dangerous event prompt information.

Step S810. Perform corresponding processing on the sensitive information obtaining event according to the dangerous event prompt information.

For example, the dangerous event prompt information may be prompted by using a voice, text, or interface graph form. Alternatively, the sensitive information obtaining event may be intercepted, terminated or the like according to the dangerous event prompt information.

In this embodiment, the cloud may return, to the mobile terminal efficiently and in time, the dangerous event prompt information corresponding to the sensitive information obtaining event for obtaining the mobile terminal sensitive information, so that the mobile terminal may perform timely and effective information security protection for the sensitive information obtaining event.

The following describes the method for delivering mobile terminal security information based on a cloud service of this application with reference to specific embodiments. The method for obtaining mobile terminal security information based on a cloud service of this application is performed by the mobile terminal, and the method for delivering mobile terminal security information based on a cloud service is performed by a server of a cloud. The method for obtaining mobile terminal security information based on a cloud service of this application and the method for delivering mobile terminal security information based on a cloud service are implemented by coordinated work of the mobile terminal and the server of the cloud.

The explanations and definitions of the terms and technical features included in the foregoing method for obtaining mobile terminal security information based on a cloud service are applicable to the method for delivering mobile terminal security information based on a cloud service in the following, and applicable to the apparatus for obtaining mobile terminal security information based on a cloud service and the apparatus for delivering mobile terminal security information based on a cloud service in the following.

Figure 9:
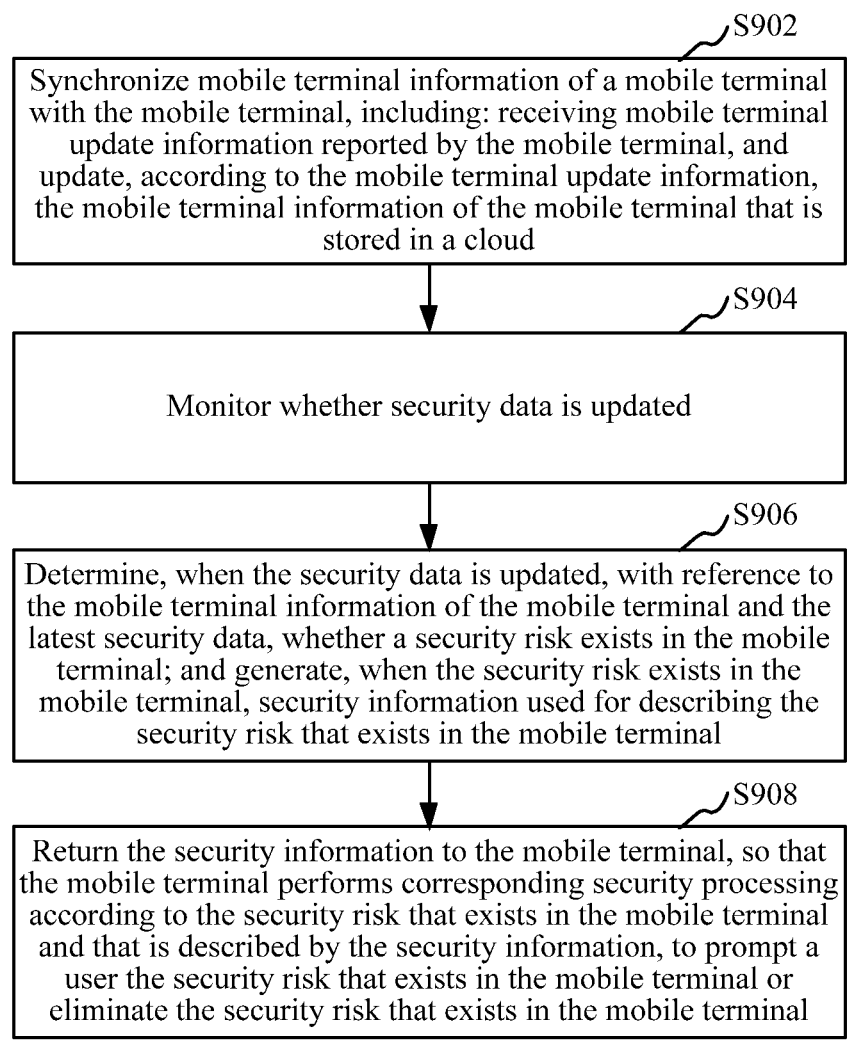
FIG. 9 is a flowchart of a method for delivering mobile terminal security information based on a cloud service in an embodiment.

As shown by the flowchart 900 in FIG. 9, in an embodiment, a method for delivering mobile terminal security information based on a cloud service includes the following steps:

Step S902. Synchronize mobile terminal information of a mobile terminal with the mobile terminal, including: receiving mobile terminal update information reported by the mobile terminal, and update, according to the mobile terminal update information, the mobile terminal information of the mobile terminal that is stored in a cloud.

In an embodiment, the user account that is currently logged in the mobile terminal and the mobile terminal update information are reported together to the cloud. In this embodiment, the cloud receives the mobile terminal update information and the user account that is currently logged in the mobile terminal that are reported by the mobile terminal, and updates, according to the received mobile terminal update information, the mobile terminal information that is corresponding to the received user account and that is stored in the cloud.

In an embodiment, the step of synchronizing mobile terminal information with a mobile terminal in step S902 further includes the following step:

obtaining, each time after the user account of the mobile terminal is logged in successfully, from the mobile terminal information stored in the cloud, mobile terminal information corresponding to the user account that is currently logged in the mobile terminal, and delivering the mobile terminal information to the mobile terminal, so that the mobile terminal updates a local configuration according to the delivered mobile terminal information, and the local configuration of the mobile terminal keeps consistent with the delivered mobile terminal information.

In the foregoing embodiments, when a same user account is logged in different mobile terminals, the mobile terminal may pull, from the cloud, the mobile terminal information corresponding to the user account, and the mobile terminal information does not need to be specified by a user repeatedly.

Step S904. Monitor whether security data is updated.

In an embodiment, the security data is used for reporting or describing software or a software behavior that may pose a security threat.

Step S906. Determine, when the security data is updated, with reference to the mobile terminal information of the mobile terminal and the latest security data, whether a security risk exists in the mobile terminal; and generate, when the security risk exists in the mobile terminal, security information used for describing the security risk that exists in the mobile terminal.

In an embodiment, the security information includes related information of one or more than two of virus software that exists in the mobile terminal, a software dangerous behavior, an operating system bug, and the like.

Step S908. Return the security information to the mobile terminal, so that the mobile terminal performs corresponding security processing according to the security risk that exists in the mobile terminal and that is described by the security information, to prompt a user the security risk that exists in the mobile terminal or eliminate the security risk that exists in the mobile terminal.

In the foregoing method for delivering mobile terminal security information based on a cloud service, mobile terminal information of a mobile terminal is synchronized with the mobile terminal, and whether security data is updated is monitored, where when the security data involving the mobile terminal information is updated, whether a security risk exists in the mobile terminal is determined with reference to the mobile terminal information and the latest security data, and when the security risk exists in the mobile terminal, security information used for describing the security risk that exists in the mobile terminal is generated, and the security information is returned to the mobile terminal. In the foregoing method, the security information generated according to the latest security data can be obtained without initiating security detection by the mobile terminal. Once security data at a cloud side is updated, and when it is determined that the risk exists in the mobile terminal, the security information may be generated and sent to the mobile terminal, so that the mobile terminal can obtain in time the security information generated according to the latest security data, so as to protect information security of the mobile terminal.

In an embodiment, the mobile terminal information includes two categories of information: device information of the mobile terminal (may be briefly referred to as device information) and user information corresponding to a user account that is currently logged in the mobile terminal (may be briefly referred to as user information).

In an embodiment, the step of synchronizing mobile terminal information of a mobile terminal with the mobile terminal in step S902 includes the following steps:

receiving device update information of the mobile terminal that is reported by the mobile terminal and user update information corresponding to a user account that is currently logged in the mobile terminal, and updating, according to the device update information and the user update information, the device information of the mobile terminal and the user information corresponding to the user account that is currently logged in the mobile terminal; and obtaining, each time after the user account of the mobile terminal is logged in successfully, the user information corresponding to the user account that is currently logged in the mobile terminal from the user information stored in the cloud, and delivering the user information to the mobile terminal, so that the mobile terminal updates a local configuration according to the delivered user information, so that the local configuration of the mobile terminal keeps consistent with the delivered user information.

In the foregoing embodiments, when a same user account is logged in different mobile terminals, the mobile terminal may pull, from the cloud, the user information corresponding to the user account, and the user information does not need to be specified by the user repeatedly.

In an embodiment, the device update information received by the cloud corresponds to a device identifier, and the user update information received by the cloud corresponds to the user account. The cloud may update, according to a correspondence between the received device identifier and the device update information, corresponding device information stored in the cloud, and update, according to a correspondence between the received user account and the user update information, corresponding user information stored in the cloud.

In an embodiment, the device update information and the user update information include update timestamps. When multiple pieces of device update information corresponding to a same device identifier and multiple pieces of user update information corresponding to a same user account are received, the corresponding device information and user information stored in the cloud may be updated in a sequence of the update timestamps of the device update information and the user update information from the earliest to the last. For example, if first user update information and second user update information correspond to a same user account, and an update timestamp of the first user update information is earlier than an update timestamp of the second user update information, corresponding user information stored in the cloud is updated first according to the first user update information, and corresponding user information stored in the cloud is then updated according to the second user update information.

In an embodiment, the mobile terminal information may include one of the two categories of the device information and the user information, so that the foregoing process of synchronizing the mobile terminal information with the mobile terminal may cover a synchronization step of the device information or a synchronization step of the user information.

In an embodiment, the mobile terminal information includes a local software list of the mobile terminal.

The security data includes virus software data.

The security information includes virus software prompt information.

Step S906 includes the following steps:
determining, when the virus software data is updated, whether virus software determined by latest virus software data includes software in the local software list; and obtaining, when the virus software determined by the latest virus software data includes the software in the local software list, the software in the local software list included in the virus software determined by the latest virus software data, and generating virus software prompt information, where the virus software prompt information is used for prompting that the obtained software is virus software.

Figure 10:
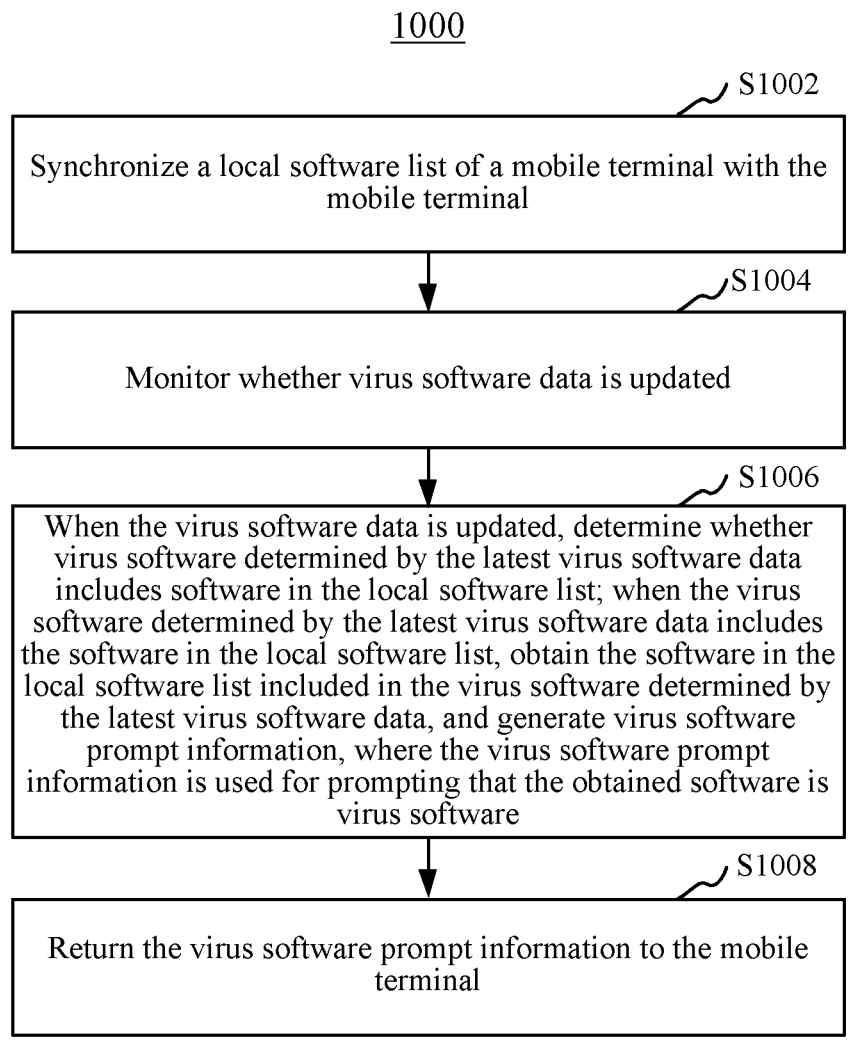
FIG. 10 is a flowchart of a process branch included in a method for delivering mobile terminal security information based on a cloud service in an embodiment.

FIG. 10 shows a flowchart 10000 of a process branch included in a method for delivering mobile terminal security information based on a cloud service in the foregoing embodiment. As shown in FIG. 10, in an embodiment, a method for delivering mobile terminal security information based on a cloud service includes the following steps:

Step S1002. Synchronize a local software list of a mobile terminal with the mobile terminal.

Step S1004. Monitor whether virus software data is updated.

Step S1006. When the virus software data is updated, determine whether virus software determined by the latest virus software data includes software in the local software list; when the virus software determined by the latest virus software data includes the software in the local software list, obtain the software in the local software list included in the virus software determined by the latest virus software data, and generate virus software prompt information, where the virus software prompt information is used for prompting that the obtained software is virus software.

Step S1008. Return the virus software prompt information to the mobile terminal.

In the foregoing embodiments, once some software in the local software list of the mobile terminal is determined as the virus software according to the latest virus software data of the cloud, the mobile terminal may receive prompt information indicating that related software in the local software list is the virus software.

In an embodiment, the mobile terminal information includes software setting information of the mobile terminal, and the software setting information is used for representing a software behavior that is allowed by a user.

The security data includes software dangerous behavior data, and the software dangerous behavior data is used for representing a dangerous behavior of software.

The security information includes dangerous behavior prompt information used for prompting a dangerous software behavior.

Step S906 includes the following steps:
determining, when the software dangerous behavior data is updated, whether a dangerous software behavior represented by the latest software dangerous behavior data and a software behavior that is allowed by the user and that is represented by the software setting information include a same behavior corresponding to same software;
obtaining the same behavior corresponding to the same software; and
generating dangerous behavior prompt information for prompting that the obtained behavior corresponding to the software is a dangerous behavior.

Figure 11:
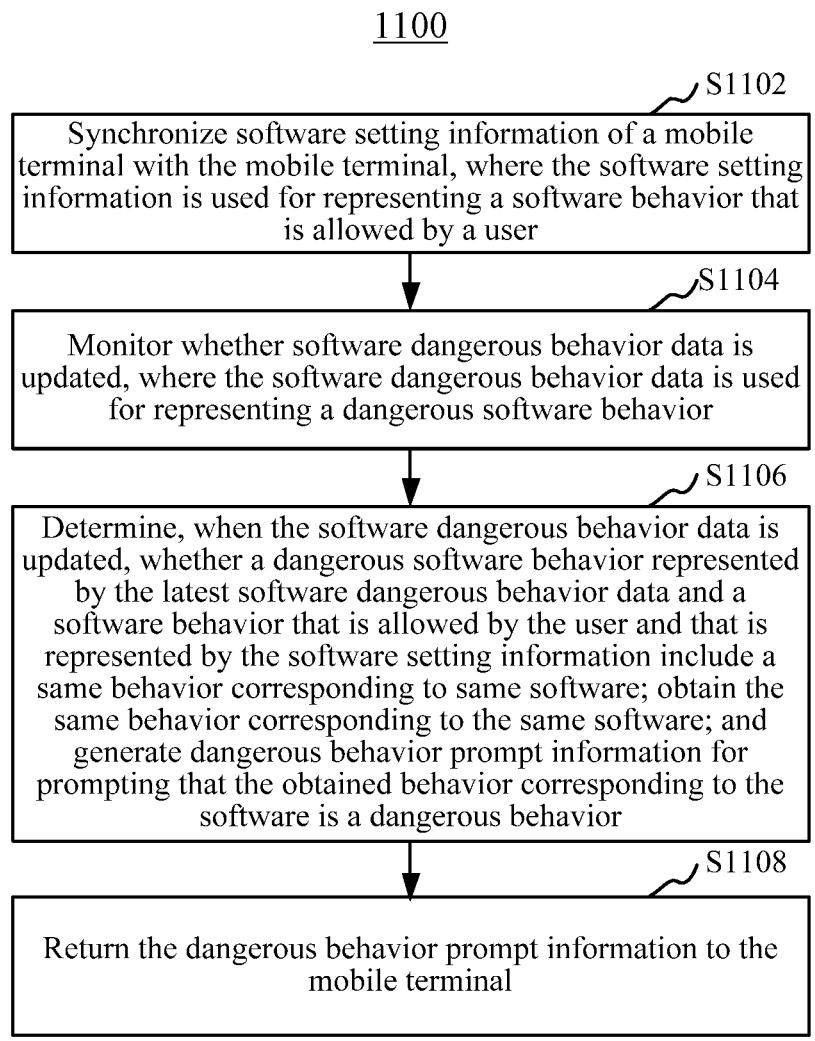
FIG. 11 is a flowchart of a process branch included in a method for delivering mobile terminal security information based on a cloud service in another embodiment.

FIG. 11 shows a flowchart 1100 of a process branch included in a method for delivering mobile terminal security information based on a cloud service in the foregoing embodiment. As shown in FIG. 11, in an embodiment, a method for delivering mobile terminal security information based on a cloud service includes the following steps:

Step S1102. Synchronize software setting information of a mobile terminal with the mobile terminal, where the software setting information is used for representing a software behavior that is allowed by a user.

Step S1104. Monitor whether software dangerous behavior data is updated, where the software dangerous behavior data is used for representing a dangerous software behavior.

Step S1106. Determine, when the software dangerous behavior data is updated, whether a dangerous software behavior represented by the latest software dangerous behavior data and a software behavior that is allowed by the user and that is represented by the software setting information include a same behavior corresponding to same software; obtain the same behavior corresponding to the same software; and generate dangerous behavior prompt information for prompting that the obtained behavior corresponding to the software is a dangerous behavior.

Step S1108. Return the dangerous behavior prompt information to the mobile terminal.

In the foregoing embodiments, once some behaviors that are allowed by the user and that are of some software in the software setting information of the mobile terminal are determined as dangerous behaviors of corresponding software by the latest software dangerous behavior data of the cloud, the mobile terminal may receive prompt information indicating that a corresponding behavior of corresponding software is a dangerous behavior.

In an embodiment, the foregoing method for delivering mobile terminal security information based on a cloud service further includes a process of generating a corresponding event security information for a security event that occurs in a mobile terminal.

Figure 12:
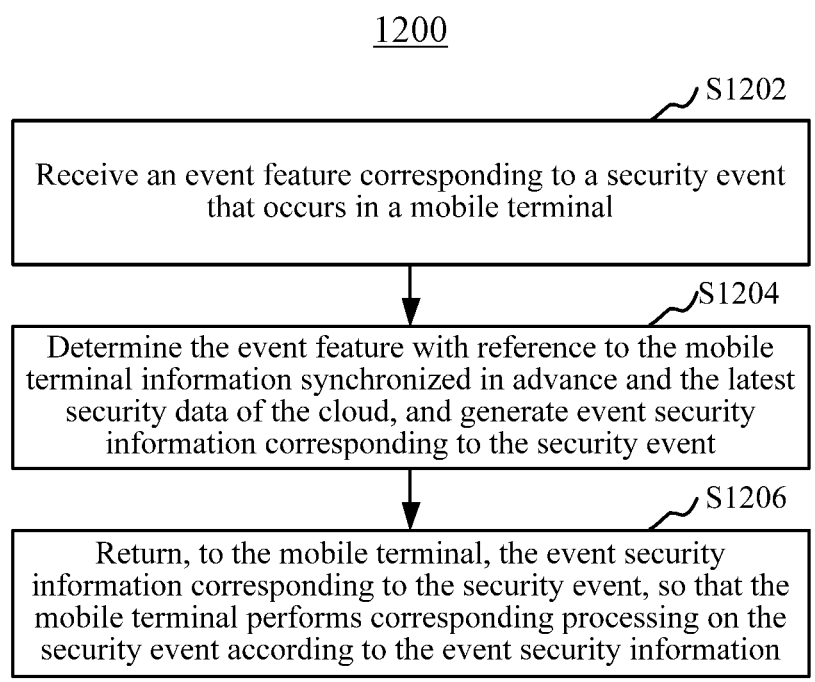
FIG. 12 is a flowchart of a process of generating corresponding event security information for a security event that occurs in a mobile terminal in an embodiment.

As shown by the flowchart 1200 in FIG. 12, in an embodiment, the process of generating corresponding event security information for a security event that occurs in a mobile terminal includes the following steps:

Step S1202. Receive an event feature corresponding to a security event that occurs in a mobile terminal.

Step S1204. Determine the event feature with reference to the mobile terminal information synchronized in advance and the latest security data of the cloud, and generate event security information corresponding to the security event.

Step S1206. Return, to the mobile terminal, the event security information corresponding to the security event, so that the mobile terminal performs corresponding processing on the security event according to the event security information.

In the foregoing embodiments, on one hand, when the security event occurs in the mobile terminal, the mobile terminal does not need to send the mobile terminal information in real time, and the cloud may perform determining according to the mobile terminal information synchronized in advance, so as to increase the speed of returning the event security information by the cloud; on the other hand, the cloud generates the event security information with reference to the latest security data, so as to improve monitoring effectiveness of the mobile terminal for the security event.

In an embodiment, the security event includes a communication event.

An event feature of the communication event includes a communication number.

The mobile terminal information includes suspected fraud numbers specified by the user.

The security data includes a fraud number set.

The event security information includes fraud number prompt information used for prompting that the communication number is a fraud number.

Step S1204 includes the following step:

determining whether the communication number corresponding to the communication event belongs to the suspected fraud numbers specified by the user and belongs to numbers in the fraud number set; and if yes, generating the fraud number prompt information.

Figure 13:
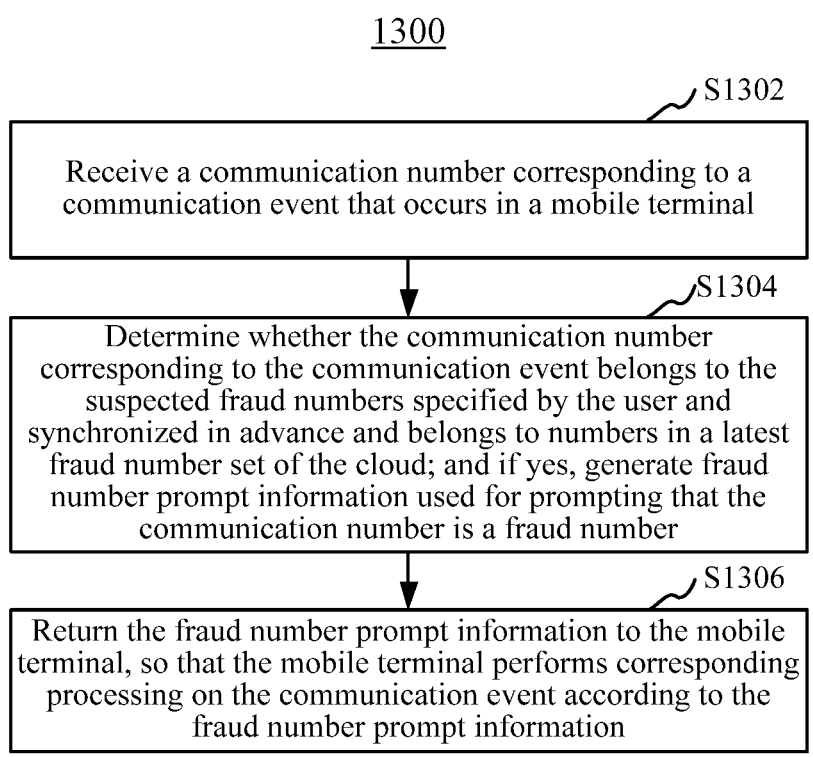
FIG. 13 is a flowchart of a process branch included in a process of generating corresponding event security information for a security event that occurs in a mobile terminal in an embodiment.

FIG. 13 shows a flowchart 1300 of a process branch included in a process of generating corresponding event security information for a security event that occurs in a mobile terminal in the foregoing embodiment.

As shown in FIG. 13, in an embodiment, the foregoing process of generating corresponding event security information for a security event that occurs in a mobile terminal includes the following steps:

Step S1302. Receive a communication number corresponding to a communication event that occurs in a mobile terminal.

Step S1304. Determine whether the communication number corresponding to the communication event belongs to the suspected fraud numbers specified by the user and synchronized in advance and belongs to numbers in a latest fraud number set of the cloud; and if yes, generate fraud number prompt information used for prompting that the communication number is a fraud number.

Step S1306. Return the fraud number prompt information to the mobile terminal, so that the mobile terminal performs corresponding processing on the communication event according to the fraud number prompt information.

In this embodiment, the cloud may return, to the mobile terminal efficiently and in time, the fraud number prompt information indicating that the communication number corresponding to the communication event is a fraud number, so that the mobile terminal may perform timely and effective information security protection for the communication event.

In an embodiment, the security event includes sensitive information obtaining event for obtaining mobile terminal sensitive information.

An event feature of the sensitive information obtaining event for obtaining mobile terminal sensitive information is used for representing a behavior of obtaining sensitive information by a trigger program of the sensitive information obtaining event.

The mobile terminal information may include software setting information of the mobile terminal, and the software setting information is used for representing a software behavior that is allowed by the user.

The security data may include software dangerous behavior data, and the software dangerous behavior data is used for representing a dangerous software behavior.

The event security information includes dangerous event prompt information used for prompting that a behavior corresponding to the sensitive information obtaining event is a dangerous behavior.

Step S1204 includes the following steps:

determining whether the behavior corresponding to the sensitive information obtaining event is represented by the software setting information as a behavior that is of the trigger program and that is allowed by the user, and is represented by the software dangerous behavior data as a dangerous behavior of the trigger program; and if yes, generating the dangerous event prompt information.

Figure 14:
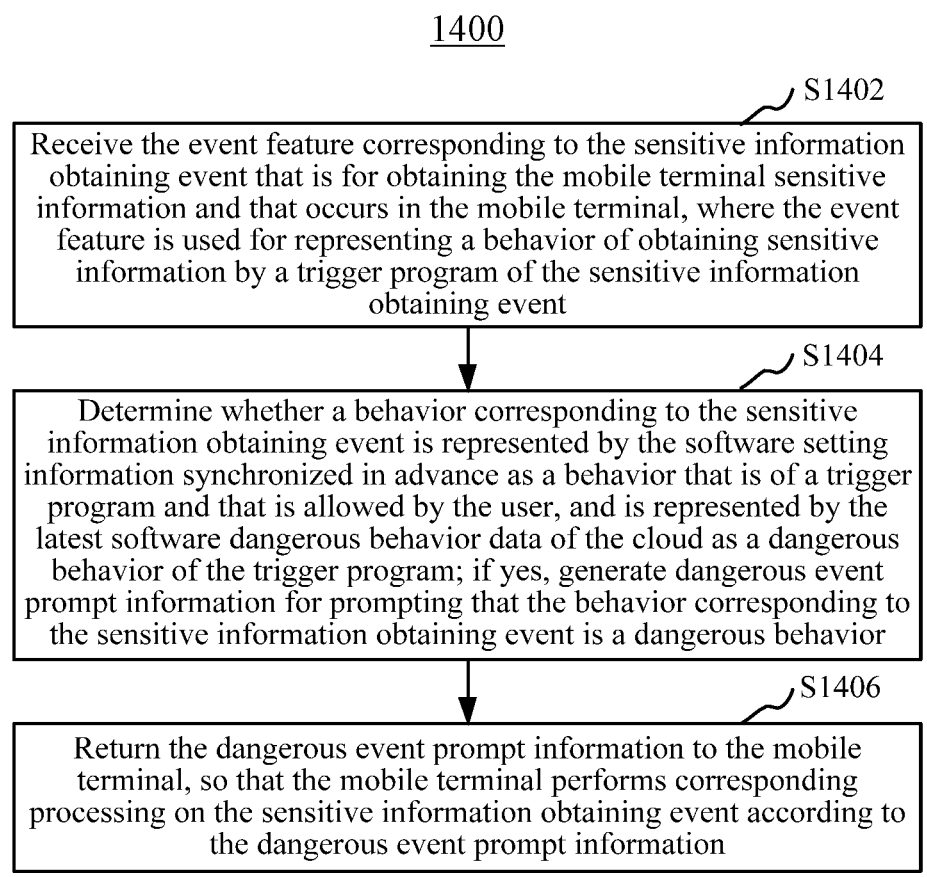
FIG. 14 is a flowchart of a process branch included in a process of generating corresponding event security information for a security event that occurs in a mobile terminal in another embodiment.

FIG. 14 shows a flowchart 1400 of a process branch included in a process of generating corresponding event security information for a security event that occurs in a mobile terminal in the foregoing embodiment.

As shown in FIG. 14, in an embodiment, the foregoing process of generating corresponding event security information for a security event that occurs in a mobile terminal includes the following steps:

Step S1402. Receive the event feature corresponding to the sensitive information obtaining event that is for obtaining the mobile terminal sensitive information and that occurs in the mobile terminal, where the event feature is used for representing a behavior of obtaining sensitive information by a trigger program of the sensitive information obtaining event.

Step S1404. Determine whether a behavior corresponding to the sensitive information obtaining event is represented by the software setting information synchronized in advance as a behavior that is of a trigger program and that is allowed by the user, and is represented by the latest software dangerous behavior data of the cloud as a dangerous behavior of the trigger program; if yes, generate dangerous event prompt information for prompting that the behavior corresponding to the sensitive information obtaining event is a dangerous behavior.

Step S1406. Return the dangerous event prompt information to the mobile terminal, so that the mobile terminal performs corresponding processing on the sensitive information obtaining event according to the dangerous event prompt information.

In this embodiment, the cloud may return, to the mobile terminal efficiently and in time, the dangerous event prompt information corresponding to the sensitive information obtaining event for obtaining the mobile terminal sensitive information, so that the mobile terminal may perform timely and effective information security protection for the sensitive information obtaining event.

In an embodiment, a terminal is provided. An internal structure of the terminal may correspond to the structure shown in FIG. 1A, and all or some of the following modules may be implemented by software, hardware, or a combination thereof.

Figure 15:
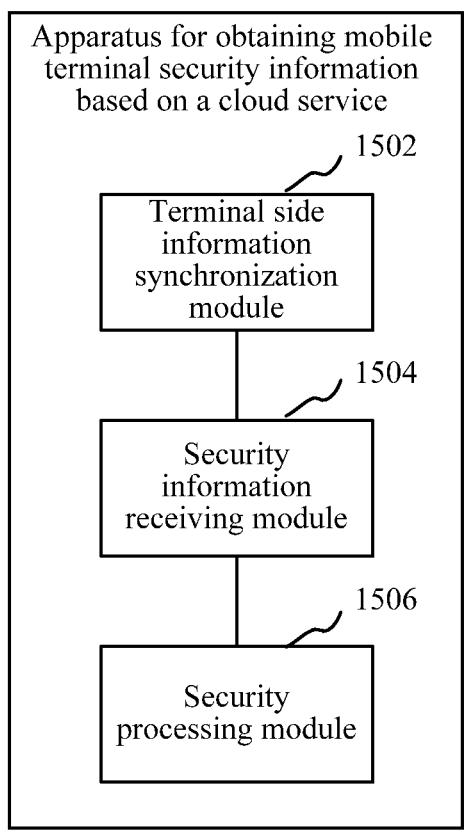
FIG. 15 is a schematic structural diagram of a terminal in an embodiment.

In an embodiment, as shown in FIG. 15, the mobile terminal 1500 in this embodiment includes a terminal side information synchronization module 1502, a security information receiving module 1504, and a security processing module 1506.

The terminal side information synchronization module 1502 is configured to synchronize mobile terminal information with a cloud, including: sending, to the cloud, mobile terminal update information corresponding to changing of the mobile terminal information, so that the cloud updates, according to the mobile terminal update information, the mobile terminal information of the mobile terminal that is stored in the cloud.

In an embodiment, if the mobile terminal 1500 has established a communication connection to the cloud, the terminal side information synchronization module 1502 sends, to the cloud in real time, the mobile terminal update information corresponding to the changing of the mobile terminal information; and if the mobile terminal 1500 has not established the communication connection to the cloud, the terminal side information synchronization module 1502 stores the mobile terminal update information corresponding to the changing of the mobile terminal information as to-be-reported mobile terminal update information, and reports the to-be-reported mobile terminal update information when the mobile terminal 1500 establishes the communication connection to the cloud.

In an embodiment, the mobile terminal information includes one or two of the following two categories of information: device information of the mobile terminal 1500 and user information of a user account that is currently logged in the mobile terminal 1500.

In an embodiment, the device information of the mobile terminal includes a local software list of the mobile terminal, an operating system version of the mobile terminal, and/or the like.

In an embodiment, the user information of the user account that is currently logged in the mobile terminal 1500 includes one or more than two of software setting information of the mobile terminal, suspected fraud numbers specified by a user, and a geographic area of the user. The software setting information is used for representing a software behavior allowed by the user, a software behavior prohibited by the user, and/or the like.

The security information receiving module 1504 is configured to receive security information sent by the cloud, where the security information is generated when the cloud determines that a security risk exists in the mobile terminal 1500, the generated security information is sent by the cloud to the mobile terminal 1500, whether the security risk exists in the mobile terminal 1500 is obtained by the cloud through determining with reference to the mobile terminal information and latest security data of the cloud, and the determining step is triggered by updating of security data of the cloud.

The security information is used for describing the security risk that exists in the mobile terminal 1500.

In an embodiment, the security information received from the cloud includes related information of one or more than two of virus software that exists in the mobile terminal 1500, a software dangerous behavior, an operating system bug, and the like, and is used for providing a basis for security protection of the mobile terminal information. For example, the security information includes virus software related information in the local software list of the mobile terminal 1500, dangerous software behavior related information in the local software list of the mobile terminal, information about a bug that exists in a current version of operating system of the mobile terminal 1500, patch software corresponding to the bug, and/or the like.

In an embodiment, the security data is used for reporting or describing software or a software behavior that may pose a security threat. The software or the software behavior that may pose a security threat includes software or a software behavior that leaks user sensitive information, steals user sensitive information, modifies operating system settings, modifies software settings, and uninstalls/installs software without a user authorization.

For example, the security data may include one or more than two of virus software data, software dangerous behavior data, and the like.

In an embodiment, the security data of the cloud may be obtained by the cloud by means of big data analysis processing, or may be obtained by the cloud by obtaining security data provided by a third party.

The security processing module 1506 is configured to perform corresponding security processing according to the security risk that exists in the mobile terminal 1500 and that is described by the security information, to prompt a user the security risk that exists in the mobile terminal or eliminate the security risk that exists in the mobile terminal 1500.

In an embodiment, corresponding security processing performed according to the security risk that exists in the mobile terminal 1500 and that is described by the security information may include processing of one or more than two of the following: prompting the security information, checking and killing corresponding software according to the security information, limiting a corresponding software behavior according to the security information, and repairing a corresponding bug according to the security information.

In an embodiment, the security processing module 1506 may generate an interface or a window whose interface content includes security information, and display the interface or window, to prompt the security information.

In an embodiment, the security information includes related information of the virus software that exists in the mobile terminal 1500. In this embodiment, the security processing module 1506 may check and kill the virus software prompted by the security information.

In an embodiment, the security information includes related information of a dangerous software behavior that exists in the mobile terminal 1500. In this embodiment, the security processing module 1506 may limit the dangerous software behavior prompted by the security information, for example, set a dangerous behavior of corresponding software to a forbidden item.

In an embodiment, the security information includes related information of an operating system bug that exists in the mobile terminal 1500. In this embodiment, the security processing module 1506 may repair a corresponding bug according to the security information.

The foregoing terminal synchronizes mobile terminal information of a mobile terminal 1500 with a cloud, and receives security information sent by the cloud, where the security information is generated when the cloud determines that a security risk exists in the mobile terminal 1500, the determining, by the cloud with reference to the mobile terminal information and latest security data, whether a risk exists in the mobile terminal 1500 is triggered by updating of security data of the cloud, and the generated security information is sent by the cloud to the mobile terminal 1500. Therefore, once security data at a cloud side is updated, and when it is determined that the risk exists in the mobile terminal 1500, the security information may be generated and sent to the mobile terminal 1500, so that the mobile terminal 1500 can receive in time the security information generated according to the latest security data, so as to protect information security of the mobile terminal 1500. The security information generated according to the latest security data can be obtained without initiating security detection by the mobile terminal 1500, so that a delay in obtaining the security information can be avoided.

In an embodiment, the terminal side information synchronization module 1502 is configured to:

each time after the mobile terminal 1500 establishes the communication connection with the cloud, locally check whether to-be-reported mobile terminal update information exists, and report the to-be-reported mobile terminal update information that exists to the cloud; and each time the mobile terminal update information changes, check whether the mobile terminal 1500 currently establishes the communication connection to the cloud; if yes, report mobile terminal update information corresponding to the changing; otherwise, store mobile terminal update information corresponding to the changing as the to-be-reported mobile terminal update information.

The mobile terminal update information may be full information of latest mobile terminal information, or may be difference information of latest mobile terminal information relative to mobile terminal information when the mobile terminal update information is reported last time.

In the foregoing embodiments, the updated mobile terminal information is always reported to the cloud at first time after the mobile terminal information is updated, and the cloud does not report the mobile terminal information only when the cloud needs to use the mobile terminal information, thereby reducing a step of obtaining mobile terminal information from the mobile terminal 1500 by the cloud in a related processing process with reference to the mobile terminal information, and improving real-time performance of the related processing process.

In an embodiment, the mobile terminal information and the mobile terminal update information correspond to the user account that is currently logged in the mobile terminal, and in the foregoing embodiments, the terminal side information synchronization module 1502 correspondingly reports, to the cloud, the to-be-reported mobile terminal update information that exists and the user account that is currently logged in the mobile terminal 1500.

Based on the foregoing embodiments, in an embodiment, the terminal side information synchronization module 1502 is further configured to:

pull, each time after the user account is logged in successfully, from the cloud, mobile terminal information corresponding to the user account that is currently logged in, and update a local configuration according to the pulled mobile terminal information, so that the local configuration keeps consistent with the pulled mobile terminal information.

In the foregoing embodiments, when a same user account is logged in different mobile terminals, the mobile terminal 1500 may pull, from the cloud, the mobile terminal information corresponding to the user account, and the mobile terminal information does not need to be specified by the user repeatedly.

In an embodiment, the mobile terminal information includes two categories of information: device information of the mobile terminal 1500 and user information corresponding to a user account that is currently logged in the mobile terminal 1500.

In this embodiment, the terminal side information synchronization module 1502 is configured to:

(1) Report, to the cloud at first time, each time the device information of the mobile terminal 1500 or the user information corresponding to the user account that is currently logged in the mobile terminal 1500 changes, device update information or user update information corresponding to the changing, so that the cloud updates, according to the device update information or user update information, device information or user information stored in the cloud.

In an embodiment, each time after the mobile terminal 1500 establishes the communication connection to the cloud, whether to-be-reported device update information and user update information exist may be locally checked, and the to-be-reported device update information that exists and the user update information are reported to the cloud.

Each time the device information of the mobile terminal 1500 or the user information corresponding to the user account that is currently logged in the mobile terminal 1500 changes, whether the mobile terminal 1500 currently establishes the communication connection to the cloud is checked; if yes, device update information or user update information corresponding to the changing is reported; otherwise, device update information or user update information corresponding to the changing is stored as to-be-reported device update information or user update information.

(2) Pull, each time after the user account is logged in successfully, from the cloud, the user information corresponding to the user account that is currently logged in, and update a local configuration according to the pulled user information, so that the local configuration keeps consistent with the pulled user information.

The device update information may be full information of latest device information, or may be difference information of latest device information relative to the device information when the device update information is reported last time.

Correspondingly, the user update information may be full information of latest user information, or may be difference information of latest user information relative to the user information when the user update information is reported last time.

In the foregoing embodiments, when a same user account is logged in different mobile terminals, the mobile terminal 1500 may pull, from the cloud, the user information corresponding to the user account, and the user information does not need to be specified by the user repeatedly.

In an embodiment, the terminal side information synchronization module 1502 correspondingly reports, to the cloud, the device update information and a device identifier to the cloud, and correspondingly reports the user update information and the user account that is currently logged in.

In an embodiment, the foregoing terminal further includes a device identifier generation module (not shown in the figure), used for generating a device identifier.

In an embodiment, the device identifier generation module may generate the device identifier according to a GUID of the mobile terminal 1500.

In an embodiment, the mobile terminal information may include one of the two categories of the device information and the user information, so that the terminal side information synchronization module 1502 may be configured to only synchronize the device information or be configured to only synchronize the user information.

In an embodiment, the mobile terminal information includes a local software list of the mobile terminal 1500; and the local software list of the mobile terminal 1500 may include software information locally installed in the mobile terminal 1500. In an embodiment, the software information may include one or more than two of a software identifier, a software name, and the like. In an embodiment, the local software list of the mobile terminal 1500 may belong to the foregoing category of device information.

In an embodiment, the security data includes virus software data, where the virus software data is used for representing virus software. For example, the virus software data may include a software identifier of the virus software, or may include a software name, dangerous information, and the like of the virus software.

In an embodiment, the security information includes virus software prompt information; and the virus software prompt information is used for prompting that software that is in the local software list of the mobile terminal 1500 and that is determined by the cloud as virus software according to latest virus software data is virus software.

The virus software prompted by the virus software prompt information belongs to the virus software determined by the cloud according to the latest virus software data and belongs to software included in the local software list of the mobile terminal 1500.

In an embodiment, updating of the virus software data of the cloud triggers generation of the virus software prompt information. When the virus software data of the cloud is updated, the cloud starts the generation of the virus software prompt information.

In the foregoing embodiments, once some software in the local software list of the mobile terminal 1500 is determined as virus software according to the latest virus software data of the cloud, and the mobile terminal 1500 may receive prompt information indicating that related software in the local software list is the virus software.

Based on the foregoing embodiments, the terminal side information synchronization module 1502 may be configured to synchronize a local software list of a mobile terminal 1500 with a cloud.

The security information receiving module 1504 may be configured to receive virus software prompt information sent by the cloud, where the virus software prompt information is generated by the cloud according to the local software list of the mobile terminal 1500 and latest virus software data of the cloud involved in the local software list, the virus software prompted by the virus software prompt information belongs to virus software determined by the cloud according to the latest virus software data and belongs to software included in the local software list of the mobile terminal 1500, and generation of the virus software prompt information is triggered by updating of the virus software data of the cloud.

The security processing module 1506 may be configured to perform corresponding security processing according to the virus software prompt information.

In an embodiment, the mobile terminal information may include software setting information of the mobile terminal 1500, where the software setting information is used for representing a software behavior allowed by a user; and the software setting information may include a software identifier of the software and a behavior identifier of the software behavior allowed by the user, and the software identifier corresponds to the behavior identifier in the software setting information. In an embodiment, the software setting information may belong to the foregoing category of user information.

The security data may include software dangerous behavior data, where the software dangerous behavior data is used for representing a dangerous software behavior; and the software dangerous behavior data may include a software identifier of the software and a behavior identifier of the dangerous software behavior, and the software identifier corresponds to the behavior identifier in the software dangerous behavior data.

The security information may include dangerous behavior prompt information used for prompting a dangerous software behavior. In an embodiment, the dangerous behavior prompt information includes related information of one or more particular behaviors of one or more pieces of software, or may include prompt information for prompting a user to perform corresponding processing on a software behavior, for example, limiting a dangerous behavior or uninstalling software.

The dangerous software behavior prompted by the dangerous behavior prompt information is represented by the software setting information as a behavior that is of corresponding software and that is allowed by the user, and is represented by the software dangerous behavior data as a dangerous behavior of the corresponding software.

In an embodiment, the generation of the dangerous behavior prompt information is triggered by the updating of the software dangerous behavior data of the cloud. When the software dangerous behavior of the cloud is updated, the cloud starts the generation of the dangerous behavior prompt information.

In the foregoing embodiments, once some behaviors that are allowed by the user and that are of some software in the software setting information of the mobile terminal 1500 are determined as dangerous behaviors of corresponding software by the latest software dangerous behavior data of the cloud, the mobile terminal 1500 may receive prompt information indicating that a corresponding behavior of corresponding software is a dangerous behavior.

Based on the foregoing embodiments, the terminal side information synchronization module 1502 may be configured to synchronize software setting information of a mobile terminal 1500 with a cloud.

The security information receiving module 1504 may be configured to receive dangerous behavior prompt information sent by the cloud, where the dangerous behavior prompt information is generated by the cloud according to the software setting information of the mobile terminal 1500 and latest software dangerous behavior data of the cloud involved in the software setting information, a dangerous software behavior prompted by the dangerous behavior prompt information is represented by the software setting information as a behavior that is of corresponding software and that is allowed by a user, and is represented by the software dangerous behavior data as a dangerous behavior of the corresponding software, and generation of the dangerous behavior prompt information is triggered by updating of the software dangerous behavior data of the cloud.

The security processing module 1506 may be configured to perform corresponding security processing according to the dangerous behavior prompt information.

Figure 16:
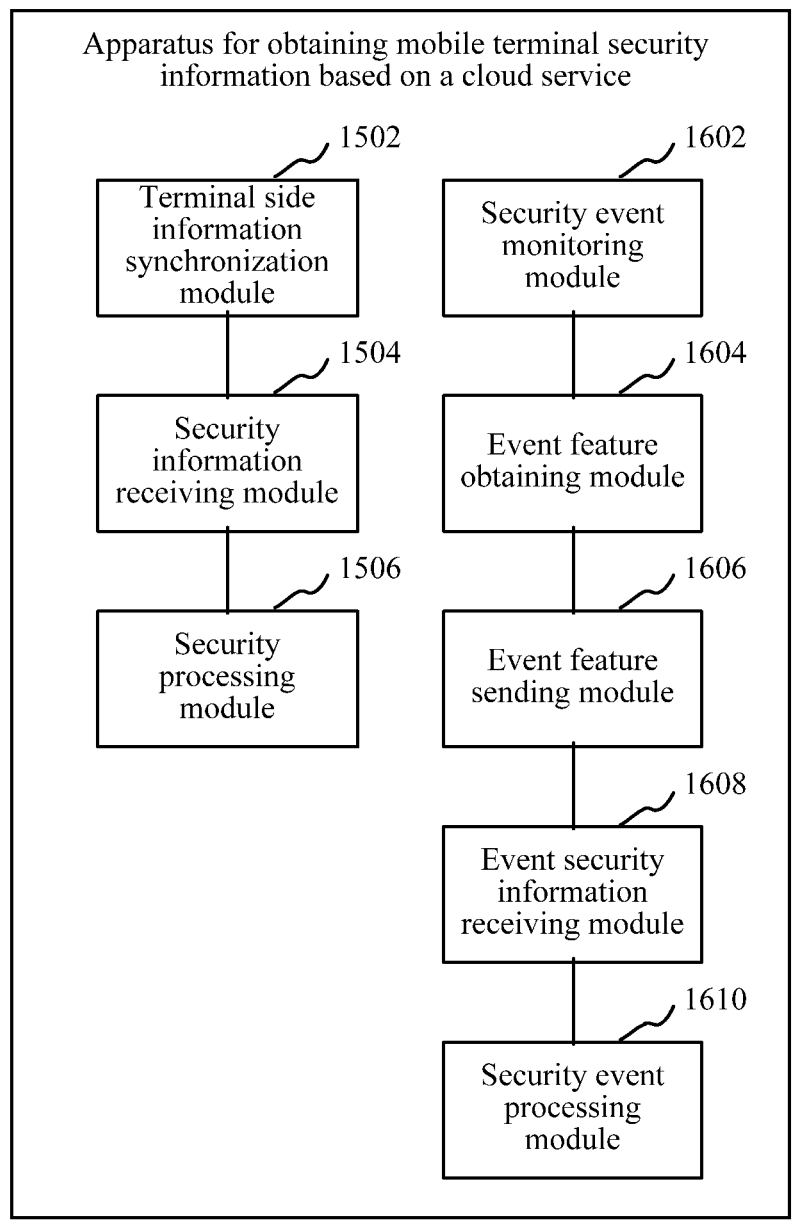
FIG. 16 is a schematic structural diagram of a terminal in another embodiment.

As shown in FIG. 16, in an embodiment, the terminal 1600 further includes a security event monitoring module 1602, an event feature obtaining module 1604, an event feature sending module 1606, an event security information receiving module 1608, and a security event processing module 1610

The security event monitoring module 1602 is configured to monitor a preset security event that occurs in a mobile terminal 1600.

In an embodiment, the preset security event may include one or more than two of a communication event and a sensitive information obtaining event for obtaining mobile terminal sensitive information.

The event feature obtaining module 1604 is configured to obtain an event feature of the security event that occurs.

The event feature is used for representing the security event, and the event feature may include one or more than two of a program identifier of a trigger program of the security event, an event type of the security event, operation behavior information corresponding to the security event, and the like.

The event feature sending module 1606 is configured to send the event feature to a cloud, so that the cloud determines the event feature with reference to the mobile terminal information and latest security data of the cloud, so as to generate event security information corresponding to the security event.

In an embodiment, the event security information may include related information of a security risk included in the security event. For example, the event security information may include prompt information indicating that a behavior executed by a security event is a dangerous behavior, or risk information of a third party related to the security event. For example, the security event is a communication event, and the event security information may include prompt information indicating that a communication number related to the communication event may be a fraud number, and the like. For another example, the security event is a payment event, the event security information may include prompt information indicating that a bonus transfer account may be a fraud account, and the like.

The event security information receiving module 1608 is configured to receive the event security information corresponding to the security event.

The security event processing module 1610 is configured to perform corresponding processing on the security event according to the event security information.

For example, the security event processing module 1610 may intercept the security event according to the event security information, to prevent further execution of the security event, or display or broadcast the event security information to prompt a user and monitor further operation of the user, and the like.

In the foregoing embodiments, when the security event occurs in the mobile terminal 1600, the mobile terminal 1600 sends an event feature to the cloud, so that the cloud may generate event security information with reference to mobile terminal information and latest security data of the cloud, and the mobile terminal 1600 may perform corresponding processing on the security event according to the event security information. In the foregoing embodiments, on one hand, the mobile terminal 1600 does not need to send the mobile terminal information in real time, so as to increase the speed of returning the event security information by the cloud; on the other hand, the cloud generates the event security information with reference to the latest security data, so as to improve monitoring effectiveness of the mobile terminal 1600 for the security event.

In an embodiment, the security event may include a communication event; and the communication event may include one or more than two of a calling event, a called event, an SMS message receiving event, an SMS message sending event, and the like. A calling event of the mobile terminal 1600 is a call event initiated by the mobile terminal, and a called event of the mobile terminal 1600 is a call event initiated by another mobile terminal and answered by the mobile terminal 1600.

The event feature of the communication event includes a communication number of the communication event. In an embodiment, the communication number of the communication event may be a communication number for communicating with the mobile terminal 1600, for example, an SMS message sending number corresponding to an SMS receiving message event of the mobile terminal 1600, an SMS message receiving number corresponding to an SMS message sending event of the mobile terminal, a called number corresponding to a calling event of the mobile terminal 1600, and a calling number corresponding to a called event of the mobile terminal 1600.

The mobile terminal information includes suspected fraud numbers specified by the user. In an embodiment, the suspected fraud numbers specified by the user may belong to the foregoing category of user information. In an embodiment, the foregoing method for obtaining mobile terminal security information based on a cloud service further includes the following steps: obtaining the suspected fraud numbers specified by the user. The suspected fraud numbers specified by the user may be obtained through a data input interface, or a suspected fraud number specified entry may be provided, and the suspected fraud numbers specified by the user are obtained from the suspected fraud number specified entry and used as the suspected fraud numbers specified by the user.

The security data may include a fraud number set. Numbers in the fraud number set are determined by the cloud as fraud numbers. The fraud number set may be obtained by the cloud by means of big data analysis processing, or may be obtained by the cloud from a third party.

The event security information may include fraud number prompt information used for prompting that the communication number is a fraud number.

The fraud number prompt information is generated by the cloud when the communication number of the communication event belongs to the suspected fraud numbers specified by the user and belongs to the numbers in the fraud number set.

Based on the foregoing embodiments, the security event monitoring module 1602 may be configured to monitor a communication event that occurs in a mobile terminal 1600.

The event feature obtaining module 1604 may be configured to obtain a communication number corresponding to the communication event that occurs.

The event feature sending module 1606 may be configured to send, to a cloud, the communication number corresponding to the communication event, so that the cloud determines the communication number with reference to the suspected fraud numbers specified by the user and a latest fraud number set of the cloud, so as to generate fraud number prompt information used for prompting that the communication number is a fraud number, where the fraud number prompt information is generated by the cloud when the communication number of the communication event belongs to the suspected fraud numbers specified by the user and belongs to the numbers in the fraud number set.

The event security information receiving module 1608 may be configured to receive the fraud number prompt information.

The security event processing module 1610 may be configured to perform corresponding processing on the communication event according to the fraud number prompt information.

For example, the security event processing module 1610 may prompt the fraud number prompt information by using a voice, text, or interface graph form. Alternatively, the communication event may be intercepted, terminated or the like according to the fraud number prompt information.

In this embodiment, the cloud may return, to the mobile terminal 1600 efficiently and in time, the fraud number prompt information indicating that the communication number corresponding to the communication event is a fraud number, so that the mobile terminal 1600 may perform timely and effective information security protection for the communication event.

In an embodiment, the security event includes a sensitive information obtaining event for obtaining mobile terminal sensitive information. In an embodiment, the mobile terminal sensitive information may include one or more than two of a root authority of an operating system of the mobile terminal 1600, contact information stored in the mobile terminal 1600, a current geographical location of the mobile terminal, SMS message content stored in the mobile terminal 1600, and the like.

An event feature of the sensitive information obtaining event is used for representing a behavior of obtaining sensitive information by a trigger program of the sensitive information obtaining event. In an embodiment, the event feature of the sensitive information obtaining event includes a program identifier of the trigger program of the sensitive information obtaining event and behavior information corresponding to the sensitive information obtaining event, for example, a behavior category or a behavior identifier. The behavior information may include the sensitive information obtained by the sensitive information obtaining event.

The mobile terminal information may include software setting information of the mobile terminal 1600, where the software setting information is used for representing a software behavior allowed by the user; and the software setting information may include a software identifier of the software and a behavior identifier of the software behavior allowed by the user, and the software identifier corresponds to the behavior identifier in the software setting information.

The security data may include software dangerous behavior data, where the software dangerous behavior data is used for representing a dangerous software behavior; and the software dangerous behavior data may include a software identifier of the software and a behavior identifier of the dangerous software behavior, and the software identifier corresponds to the behavior identifier in the software dangerous behavior data.

The event security information includes dangerous event prompt information used for prompting that a behavior corresponding to the sensitive information obtaining event is a dangerous behavior.

The dangerous event prompt information is generated by the cloud when the following condition is met: the behavior corresponding to the sensitive information obtaining event is represented by the software setting information as a behavior that is of the trigger program and that is allowed by the user, and is represented by the software dangerous behavior data as a dangerous behavior of the trigger program.

Based on the foregoing embodiments, the security event monitoring module 1602 may be configured to monitor a sensitive information obtaining event that is for obtaining mobile terminal sensitive information and that occurs in a mobile terminal 1600.

The event feature obtaining module 1604 may be configured to obtain an event feature of the sensitive information obtaining event that occurs.

The event feature sending module 1606 may be configured to send the event feature of the sensitive information obtaining event to a cloud, so that the cloud determines the event feature with reference to software setting information of the mobile terminal 1600 and latest software dangerous behavior data of the cloud, so as to generate dangerous event prompt information used for prompting that a behavior corresponding to the sensitive information obtaining event is a dangerous behavior, where the dangerous event prompt information is generated by the cloud when the following condition is met: the behavior corresponding to the sensitive information obtaining event is represented by the software setting information as a behavior that is of a trigger program and that is allowed by a user, and is represented by the software dangerous behavior data as a dangerous behavior of the trigger program.

The event security information receiving module 1608 may be configured to receive the dangerous event prompt information.

The security event processing module 1610 may be configured to perform corresponding processing on the sensitive information obtaining event according to the dangerous event prompt information.

For example, the security event processing module 1610 may prompt the dangerous event prompt information by using a voice, text, or interface graph form. Alternatively, the sensitive information obtaining event may be intercepted, terminated or the like according to the dangerous event prompt information.

In this embodiment, the cloud may return, to the mobile terminal 1600 efficiently and in time, the dangerous event prompt information corresponding to the sensitive information obtaining event for obtaining the mobile terminal sensitive information, so that the mobile terminal 1600 may perform timely and effective information security protection for the sensitive information obtaining event.

In an embodiment, a server is provided. An internal structure of the server may be correspond to the structure shown in FIG. 1B, and all or some of the following modules may be implemented by software, hardware, or a combination thereof.

Figure 17:
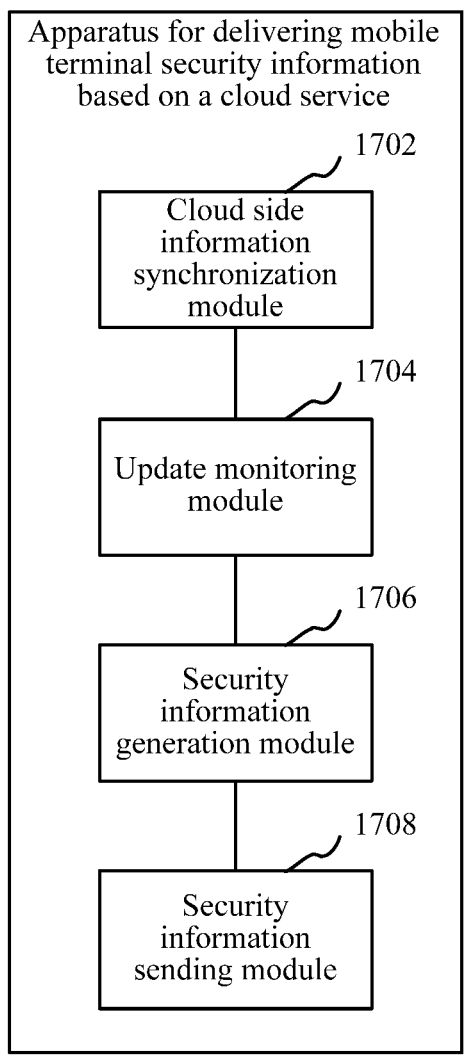
FIG. 17 is a schematic structural diagram of a server in an embodiment.

In an embodiment, as shown in FIG. 17, the server 1700 in this embodiment includes a cloud side information synchronization module 1702, an update monitoring module 1704, a security information generation module 1706, and a security information sending module 1708.

The cloud side information synchronization module 1702 may be configured to synchronize mobile terminal information with a mobile terminal. In an embodiment, the cloud side information synchronization module 1702 may be configured to receive mobile terminal update information reported by the mobile terminal, and update, according to the mobile terminal update information, the mobile terminal information of the mobile terminal that is stored in a cloud.

In an embodiment, the user account that is currently logged in the mobile terminal and the mobile terminal update information are reported together to the cloud. In this embodiment, the cloud side information synchronization module 1702 receives the mobile terminal update information and the user account that is currently logged in the mobile terminal that are reported by the mobile terminal, and updates, according to the received mobile terminal update information, the mobile terminal information that is corresponding to the received user account and that is stored in the cloud.

In an embodiment, the cloud side information synchronization module 1702 is further configured to:

obtain, each time after the user account of the mobile terminal is logged in successfully, from the mobile terminal information stored in the cloud, mobile terminal information corresponding to the user account that is currently logged in the mobile terminal, and deliver the mobile terminal information to the mobile terminal, so that the mobile terminal updates a local configuration according to the delivered mobile terminal information, and the local configuration of the mobile terminal keeps consistent with the delivered mobile terminal information.

In the foregoing embodiments, when a same user account is logged in different mobile terminals, the mobile terminal may pull, from the cloud, the mobile terminal information corresponding to the user account, and the mobile terminal information does not need to be specified by a user repeatedly.

The update monitoring module 1704 is configured to monitor whether security data is updated.

In an embodiment, the security data is used for reporting or describing software or a software behavior that may pose a security threat.

The security information generation module 1706 is configured to determine, when the security data is updated, with reference to the mobile terminal information of the mobile terminal and the latest security data, whether a security risk exists in the mobile terminal; and generate, when the security risk exists in the mobile terminal, security information used for describing the security risk that exists in the mobile terminal.

In an embodiment, the security information includes related information of one or more than two of virus software that exists in the mobile terminal, a software dangerous behavior, an operating system bug, and the like.

The security information sending module 1708 is configured to return the security information to the mobile terminal, so that the mobile terminal performs corresponding security processing according to the security risk that exists in the mobile terminal and that is described by the security information, to prompt a user the security risk that exists in the mobile terminal or eliminate the security risk that exists in the mobile terminal.

The foregoing server 1700 synchronizes mobile terminal information of a mobile terminal with the mobile terminal, and monitors whether security data is updated, where when the security data involving the mobile terminal information is updated, whether a security risk exists in the mobile terminal is determined with reference to the mobile terminal information and the latest security data, and when the security risk exists in the mobile terminal, security information used for describing the security risk that exists in the mobile terminal is generated, and the security information is returned to the mobile terminal. The foregoing server 1700 can obtain the security information generated according to the latest security data without initiating security detection by the mobile terminal. Once security data at a cloud side is updated, and when it is determined that the risk exists in the mobile terminal, the security information may be generated and sent to the mobile terminal, so that the mobile terminal can obtain in time the security information generated according to the latest security data, so as to protect information security of the mobile terminal.

In an embodiment, the mobile terminal information includes two categories of information: device information of the mobile terminal and user information corresponding to a user account that is currently logged in the mobile terminal.

In an embodiment, the cloud side information synchronization module 1702 is configured to:

receive device update information of the mobile terminal that is reported by the mobile terminal and user update information corresponding to a user account that is currently logged in the mobile terminal, and update, according to the device update information and the user update information, the device information of the mobile terminal and the user information corresponding to the user account that is currently logged in the mobile terminal; and obtain, each time after the user account of the mobile terminal is logged in successfully, the user information corresponding to the user account that is currently logged in the mobile terminal from the user information stored in the cloud, and deliver the user information to the mobile terminal, so that the mobile terminal updates a local configuration according to the delivered user information, so that the local configuration of the mobile terminal keeps consistent with the delivered user information.

In the foregoing embodiments, when a same user account is logged in different mobile terminals, the mobile terminal may pull, from the cloud, the user information corresponding to the user account, and the user information does not need to be specified by the user repeatedly.

In an embodiment, the device update information received by the cloud corresponds to a device identifier, and the user update information received by the cloud corresponds to the user account. The cloud side information synchronization module 1702 may update, according to a correspondence between the received device identifier and the device update information, corresponding device information stored in the cloud, and update, according to a correspondence between the received user account and the user update information, corresponding user information stored in the cloud.

In an embodiment, the device update information and the user update information include update timestamps. When multiple pieces of device update information corresponding to a same device identifier and multiple pieces of user update information corresponding to a same user account are received, the cloud side information synchronization module 1702 may update the corresponding device information and user information stored in the cloud in a sequence of the update timestamps of the device update information and the user update information from the earliest to the last. For example, if first user update information and second user update information correspond to a same user account, and an update timestamp of the first user update information is earlier than an update timestamp of the second user update information, the cloud side information synchronization module 1702 may first update corresponding user information stored in the cloud according to the first user update information, and then update, according to the second user update information, corresponding user information stored in the cloud.

In an embodiment, the mobile terminal information may include one of the two categories of the device information and the user information, so that the cloud side information synchronization module 1702 may be configured to only synchronize the device information or be configured to only synchronize the user information.

In an embodiment, the mobile terminal information includes a local software list of the mobile terminal.

The security data includes virus software data.

The security information includes virus software prompt information.

The security information generation module 1706 is configured to:

determine, when the virus software data is updated, whether virus software determined by latest virus software data includes software in the local software list; and obtain, when the virus software determined by the latest virus software data includes the software in the local software list, the software in the local software list included in the virus software determined by the latest virus software data, and generate virus software prompt information, where the virus software prompt information is used for prompting that the obtained software is virus software.

Based on the foregoing embodiments, the cloud side information synchronization module 1702 may be configured to synchronize a local software list of a mobile terminal with the mobile terminal.

The update monitoring module 1704 may be configured to monitor whether virus software data is updated.

The security information generation module 1706 may be configured to determine, when the virus software data is updated, whether the virus software determined by the latest virus software data includes software in the local software list; and obtain, when the virus software determined by the latest virus software data includes software in the local software list, software in the local software list included in the virus software determined by the latest virus software data, and generate virus software prompt information, the virus software prompt information being used for prompting that the obtained software is virus software.

The security information sending module 1708 may be configured to return the virus software prompt information to the mobile terminal.

In the foregoing embodiments, once some software in the local software list of the mobile terminal is determined as the virus software according to the latest virus software data of the cloud, the mobile terminal may receive prompt information indicating that related software in the local software list is the virus software.

In an embodiment, the mobile terminal information includes software setting information of the mobile terminal, and the software setting information is used for representing a software behavior that is allowed by a user.

The security data includes software dangerous behavior data, and the software dangerous behavior data is used for representing a dangerous behavior of software.

The security information includes dangerous behavior prompt information used for prompting a dangerous software behavior.

The security information generation module 1706 is configured to:

determine, when the software dangerous behavior data is updated, whether a dangerous software behavior represented by the latest software dangerous behavior data and a software behavior that is allowed by the user and that is represented by the software setting information include a same behavior corresponding to same software; obtain the same behavior corresponding to the same software; and generate dangerous behavior prompt information for prompting that the obtained behavior corresponding to the software is a dangerous behavior.

Based on the foregoing embodiments, the cloud side information synchronization module 1702 may be configured to synchronize software setting information of a mobile terminal with the mobile terminal, where the software setting information is used for representing a software behavior that is allowed by a user.

The update monitoring module 1704 may be configured to monitor whether software dangerous behavior data is updated, where the software dangerous behavior data is used for representing a dangerous software behavior.

The security information generation module 1706 may be configured to determine, when the software dangerous behavior data is updated, whether a dangerous software behavior represented by the latest software dangerous behavior data and a software behavior that is allowed by the user and that is represented by the software setting information include a same behavior corresponding to same software; obtain the same behavior corresponding to the same software; and generate dangerous behavior prompt information for prompting that the obtained behavior corresponding to the software is a dangerous behavior.

The security information sending module 1708 may be configured to return the dangerous behavior prompt information to the mobile terminal.

In the foregoing embodiments, once some behaviors that are allowed by the user and that are of some software in the software setting information of the mobile terminal are determined as dangerous behaviors of corresponding software by the latest software dangerous behavior data of the cloud, the mobile terminal may receive prompt information indicating that a corresponding behavior of corresponding software is a dangerous behavior.

Figure 18:
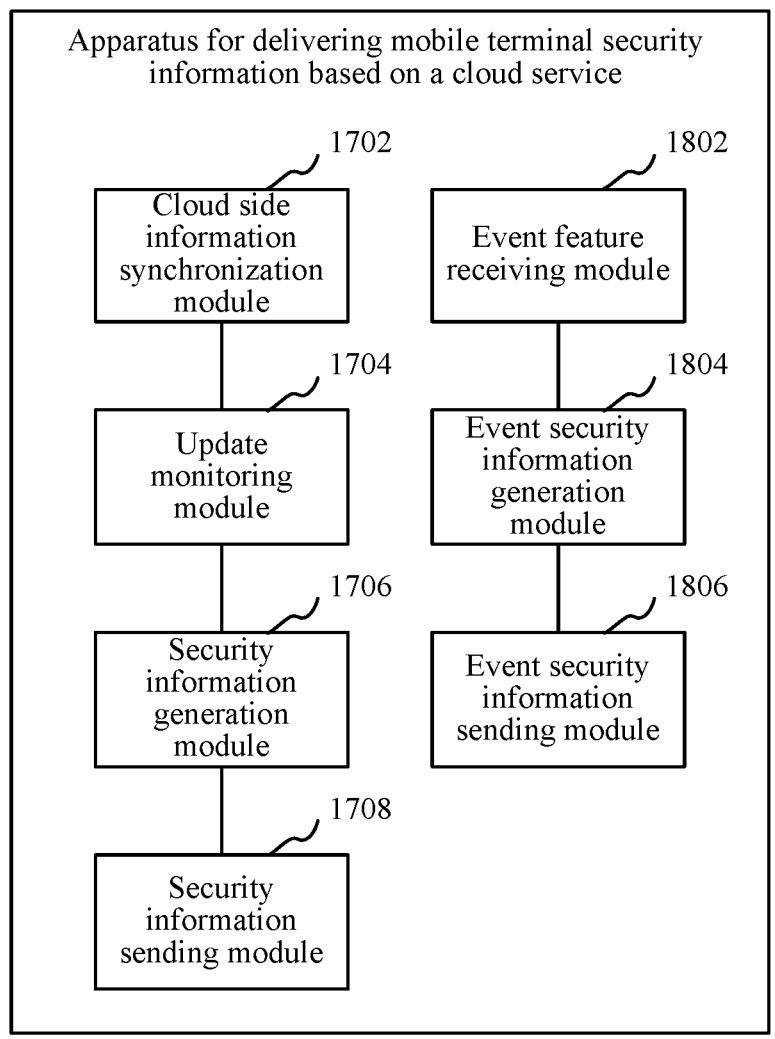
FIG. 18 is a schematic structural diagram of a server in another embodiment.

In an embodiment, as shown in FIG. 18, the server 1800 further includes an event feature receiving module 1802, an event security information generation module 1804, and an event security information sending module 1806.

The event feature receiving module 1802 is configured to receive an event feature corresponding to a security event that occurs in a mobile terminal.

The event security information generation module 1804 is configured to determine the event feature with reference to the mobile terminal information synchronized in advance and the latest security data of the cloud, and generate event security information corresponding to the security event.

The event security information sending module 1806 is configured to return, to the mobile terminal, the event security information corresponding to the security event, so that the mobile terminal performs corresponding processing on the security event according to the event security information.

In the foregoing embodiments, on one hand, when the security event occurs in the mobile terminal, the mobile terminal does not need to send the mobile terminal information in real time, and the cloud may perform determining according to the mobile terminal information synchronized in advance, so as to increase the speed of returning the event security information by the cloud; on the other hand, the cloud generates the event security information with reference to the latest security data, so as to improve monitoring effectiveness of the mobile terminal for the security event.

In an embodiment, the security event includes a communication event.

An event feature of the communication event includes a communication number.

The mobile terminal information includes suspected fraud numbers specified by the user.

The security data includes a fraud number set.

The event security information includes fraud number prompt information used for prompting that the communication number is a fraud number.

The event security information generation module 1804 is configured to:

determine whether the communication number corresponding to the communication event belongs to the suspected fraud numbers specified by the user and belongs to numbers in the fraud number set; and if yes, generate the fraud number prompt information.

Based on the foregoing embodiments, the event feature receiving module 1802 may be configured to receive a communication number corresponding to the communication event that occurs in the mobile terminal.

The event security information generation module 1804 may be configured to determine whether the communication number corresponding to the communication event belongs to the suspected fraud numbers specified by the user and synchronized in advance and belongs to numbers in a latest fraud number set of the cloud; and if yes, generate fraud number prompt information used for prompting that the communication number is a fraud number.

The event security information sending module 1806 may be configured to return the fraud number prompt information to the mobile terminal, so that the mobile terminal performs corresponding processing on the communication event according to the fraud number prompt information.

In this embodiment, the fraud number prompt information indicating that the communication number corresponding to the communication event is a fraud number may be returned to the mobile terminal efficiently and in time, so that the mobile terminal may perform timely and effective information security protection for the communication event.

In an embodiment, the security event includes a sensitive information obtaining event for obtaining mobile terminal sensitive information.

An event feature of the sensitive information obtaining event for obtaining mobile terminal sensitive information is used for representing a behavior of obtaining sensitive information by a trigger program of the sensitive information obtaining event.

The mobile terminal information may include software setting information of the mobile terminal, and the software setting information is used for representing a software behavior that is allowed by the user.

The security data may include software dangerous behavior data, and the software dangerous behavior data is used for representing a dangerous software behavior.

The event security information includes dangerous event prompt information used for prompting that a behavior corresponding to the sensitive information obtaining event is a dangerous behavior.

The security information generation module 1804 is configured to:

determine whether the behavior corresponding to the sensitive information obtaining event is represented by the software setting information as a behavior that is of the trigger program and that is allowed by the user, and is represented by the software dangerous behavior data as a dangerous behavior of the trigger program; and if yes, generate the dangerous event prompt information.

Based on the foregoing embodiments, the event feature receiving module 1802 may be configured to receive the event feature corresponding to the sensitive information obtaining event that is for obtaining the mobile terminal sensitive information and that occurs in the mobile terminal, where the event feature is used for representing a behavior of obtaining sensitive information by a trigger program of the sensitive information obtaining event.

The event security information generation module 1804 may be configured to determine whether a behavior corresponding to the sensitive information obtaining event is represented by the software setting information synchronized in advance as a behavior that is of a trigger program and that is allowed by the user, and is represented by the latest software dangerous behavior data of the cloud as a dangerous behavior of the trigger program; if yes, generate dangerous event prompt information for prompting that the behavior corresponding to the sensitive information obtaining event is a dangerous behavior.

The event security information sending module 1806 may be configured to return the dangerous event prompt information to the mobile terminal, so that the mobile terminal performs corresponding processing on the sensitive information obtaining event according to the dangerous event prompt information.

In this embodiment, the dangerous event prompt information corresponding to the sensitive information obtaining event for obtaining the mobile terminal sensitive information may be returned to the mobile terminal efficiently and in time, so that the mobile terminal may perform timely and effective information security protection for the sensitive information obtaining event.

A person of ordinary skill in the art may understand that all or some processes for implementing the foregoing embodiment methods may be completed by a computer program instructing related hardware. The program may be stored in a computer readable storage medium. When the program is running, the processes in the embodiments of the foregoing methods may be included. The storage medium may be a nonvolatile storage medium such as a magnetic disk, an optical disc, a read-only memory (ROM), or a random access memory (RAM).

The foregoing technical features of the embodiments may be combined randomly. For ease of description, not all possible combinations of the technical features in the foregoing embodiments are described. However, as long as these combinations of the technical features do not conflict, the combinations shall be considered as the scope recorded in this specification.

The foregoing embodiments describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method for a mobile terminal to obtain mobile terminal security information based on secure communications with a cloud network, the method comprising:

monitoring, on the mobile terminal, software behavior of a software executing on the mobile terminal;

monitoring, on the mobile terminal, a security event occurring on the mobile terminal, wherein the security event comprises a communication event between the mobile terminal and a secondary mobile terminal;

obtaining an event feature of the security event, wherein the event feature comprises a communication number of the secondary mobile terminal;

transmitting, to the cloud network, mobile terminal update information corresponding to a change in mobile terminal information, wherein the mobile terminal update information includes the software behavior and the event feature, and wherein the cloud network is configured to update the mobile terminal information of the mobile terminal stored in the cloud network according to the mobile terminal update information;

receiving, by the mobile terminal, security information and event security information sent by the cloud network, wherein the security information identifies an existing security risk on the mobile terminal and the event security information identifies an existing security event on the mobile terminal, wherein the cloud network is configured to identify the existing security risk on the mobile terminal based on determining the software behavior corresponds to a security threat included in security data stored on the cloud network, and wherein the cloud network is configured to identify the existing security event on the mobile terminal based on determining the communication number of the secondary mobile terminal corresponds to a suspected fraud number included in the mobile terminal information stored on the cloud network;

implementing a security protocol according to the existing security risk, the security protocol including at least one of:
  presenting a prompt identifying the existing security risk or eliminating the existing security risk from the mobile terminal; and
  presenting a prompt identifying the communication number of the secondary mobile terminal as a suspected fraud number.

2. The method according to claim 1, wherein the mobile terminal information includes two categories of information: a device information of the mobile terminal, and a user information corresponding to a user account that is currently logged into the mobile terminal; and
  wherein transmitting the mobile terminal update information to the cloud network comprises:
  reporting, to the cloud network at a first time, device update information or user update information describing each instance of changes to the device information or the user information, respectively, wherein the cloud network updates the device information or the user information stored in the cloud network according to the device update information or the user update information; and
  retrieving from the cloud network, each time after the user account is logged into successfully, user information corresponding to the user account that is currently logged in, and updating a local configuration according to the retrieved user information, wherein the local configuration keeps consistent with the retrieved user information.

3. The method according to claim 1, wherein the mobile terminal information comprises a local software list of the mobile terminal;
the security data comprises virus software data;
the security information comprises virus software prompt information; and
wherein a virus software prompted by the virus software prompt information is included in a group determined by the cloud network according to a latest virus software data and is included in the local software list.

4. The method according to claim 1, wherein the mobile terminal information comprises software setting information of the mobile terminal, and the software setting information represents allowable software behavior allowed by a user;
the security data comprises software dangerous behavior data, the software dangerous behavior data including a dangerous software behavior;
the security information comprises dangerous behavior prompt information used for prompting the dangerous software behavior; and
wherein the software behavior monitored on the mobile device matches the dangerous software behavior, and the dangerous software behavior is represented by the software setting information as a behavior that is of a corresponding software and that is allowed by the user, and is represented by the software dangerous behavior data as a dangerous behavior of the corresponding software.

5. The method according to claim 1, wherein the security event further comprises a sensitive information obtaining event for obtaining mobile terminal sensitive information;
the event feature is used for representing a behavior of obtaining sensitive information by a trigger program of the sensitive information obtaining event;
the mobile terminal information comprises software setting information of the mobile terminal, the software setting information referenced to represent a software behavior that is allowed by the user;
the security data comprises software dangerous behavior data, the software dangerous behavior data referenced to represent a dangerous software behavior;
the event security information comprises dangerous event prompt information referenced to identify a behavior corresponding to the sensitive information obtaining event is a dangerous behavior; and
the dangerous event prompt information is generated by the cloud network when the behavior corresponding to the sensitive information obtaining event is represented by the software setting information as a behavior that is of the trigger program and that is allowed by a user, and is represented by the software dangerous behavior data as a dangerous behavior of the trigger program.

6. A mobile terminal for obtaining mobile terminal security information from a cloud network, the mobile terminal comprising a memory and a processor, the memory storing processor executable instructions, wherein when being executed by the processor, the processor executable instructions cause the processor to perform the following method:
  monitoring, on the mobile terminal, software behavior of a software executing on the mobile terminal;
  monitoring, on the mobile terminal, a security event occurring on the mobile terminal, wherein the security event comprises a communication event between the mobile terminal and a secondary mobile terminal;
  obtaining an event feature of the security event, wherein the event feature comprises a communication number of the secondary mobile terminal;
  transmitting, to the cloud network, mobile terminal update information corresponding to a change in mobile terminal information, wherein the mobile terminal update information includes the software behavior and the event feature, and wherein the cloud network updates is configured to update the mobile terminal information of the mobile terminal stored in the cloud network according to the mobile terminal update information;

receiving, by the mobile terminal, security information and event security information sent by the cloud network, wherein the security information identifies an existing security risk on the mobile terminal and the event security information identifies an existing security event on the mobile terminal, wherein the cloud network is configured to identify the existing security risk on the mobile terminal based on determining the software behavior corresponds to a security threat included in security data stored on the cloud network, and wherein the cloud network is configured to identify the existing security event on the mobile terminal based on determining the communication number of the secondary mobile terminal corresponds to a suspected fraud number included in the mobile terminal information stored on the cloud network;

implementing a security protocol according to the existing security risk, the security protocol including at least one of:
  presenting a prompt identifying the existing security risk or eliminating the existing security risk from the mobile terminal; and
  presenting a prompt identifying the communication number of the secondary mobile terminal as a suspected fraud number.

7. The mobile terminal according to claim 6, wherein the mobile terminal information includes two categories of information: a device information of the mobile terminal, and a user information corresponding to a user account that is currently logged into the mobile terminal; and
  wherein transmitting the mobile terminal update information to the cloud network comprises:
    reporting, to the cloud network at a first time, device update information or user update information describing each instance of changes to the device information or the user information, respectively, wherein the cloud network updates the device information or the user information stored in the cloud network according to the device update information or the user update information; and
    retrieving from the cloud network, each time after the user account is logged into successfully, user information corresponding to the user account that is currently logged in, and updating a local configuration according to the retrieved user information, wherein the local configuration keeps consistent with the retrieved user information.

8. The mobile terminal according to claim 6, wherein the mobile terminal information comprises a local software list of the mobile terminal;
  the security data comprises virus software data;
  the security information comprises virus software prompt information; and
  wherein a virus software prompted by the virus software prompt information is included in a group determined by the cloud network according to a latest virus software data and is included in the local software list.

9. The mobile terminal according to claim 6, wherein the mobile terminal information comprises software setting information of the mobile terminal, and the software setting information represents allowable software behavior allowed by a user;
  the security data comprises software dangerous behavior data, the software dangerous behavior data including a dangerous software behavior;
  the security information comprises dangerous behavior prompt information used for prompting the dangerous software behavior; and
  wherein the software behavior monitored on the mobile device matches the dangerous software behavior, and the dangerous software behavior is represented by the software setting information as a behavior that is of a corresponding software and that is allowed by the user, and is represented by the software dangerous behavior data as a dangerous behavior of the corresponding software.

10. The mobile terminal according to claim 6, wherein the security event further comprises a sensitive information obtaining event for obtaining mobile terminal sensitive information;
  the event feature is used for representing a behavior of obtaining sensitive information by a trigger program of the sensitive information obtaining event;
  the mobile terminal information comprises software setting information of the mobile terminal, the software setting information referenced to represent a software behavior that is allowed by a user;
  the security data comprises software dangerous behavior data, the software dangerous behavior data referenced to represent a dangerous software behavior;
  the event security information comprises dangerous event prompt information referenced to identify a behavior corresponding to the sensitive information obtaining event is a dangerous behavior; and
  the dangerous event prompt information is generated by the cloud when the behavior corresponding to the sensitive information obtaining event is represented by the software setting information as a behavior that is of the trigger program and that is allowed by the user, and is represented by the software dangerous behavior data as a dangerous behavior of the trigger program.

11. A server, comprising a memory and a processor, the memory storing processor executable instructions, wherein when being executed by the processor, the processor executable instructions cause the processor to perform the following method:
  receiving mobile terminal update information from a mobile terminal, wherein the mobile terminal update information includes software behavior of a software executing on the mobile terminal, a security event occurring on the mobile terminal, and an event feature of the security event, wherein the security event comprises a communication event between the mobile terminal and a secondary mobile terminal, and wherein the event feature comprises a communication number of the secondary mobile terminal;
  updating the mobile terminal information of the mobile terminal stored in a cloud according to the mobile terminal update information;
  monitoring whether security data corresponding to the mobile terminal is updated, wherein the security data is referenced when reporting or describing software or a software behavior identified as posing a security threat;
  determining, when the security data is updated, an existing security risk exists in the mobile terminal based on the software behavior corresponding to a security threat included in the security data;
  identifying an existing security event on the mobile terminal based on determining the communication number of the secondary mobile terminal corresponds to a suspected fraud number included in the mobile terminal information stored on the cloud network;

generating security information describing the existing security risk and event security information identifying the existing security event on the mobile terminal; and transmitting the security information and the event security information to the mobile terminal, wherein the mobile terminal is configured to implement a security processing according to the existing security risk, the security processing including at least one of: presenting a prompt identifying the existing security risk or eliminating the existing security risk from the mobile terminal, and presenting a prompt identifying the communication number of the secondary mobile terminal as a suspected fraud number.

12. The server according to claim 11, wherein the mobile terminal information includes two categories of information: a device information of the mobile terminal, and a user information corresponding to a user account that is currently logged into the mobile terminal; and wherein receiving the mobile terminal update information from the mobile terminal comprises:

receiving device update information of the mobile terminal reported by the mobile terminal;

receiving user update information corresponding to a user account currently logged in the mobile terminal;

updating, according to the device update information and the user update information, the device information of the mobile terminal and the user information corresponding to the user account that are stored in the cloud; and obtaining, each time after the user account of the mobile terminal is logged in successfully, the user information corresponding to the user account from the user information stored in the cloud; and transmitting the user information to the mobile terminal, wherein the mobile terminal updates a local configuration according to the transmitted user information, wherein the local configuration of the mobile terminal keeps consistent with the transmitted user information.

13. The server according to claim 11, wherein the mobile terminal information comprises a local software list of the mobile terminal;

the security data comprises virus software data, and the security information comprises virus software prompt information; and wherein determining whether the existing security risk exists in the mobile terminal comprises:

determining, when the virus software data is updated, whether virus software determined by latest virus software data comprises software in the local software list; and wherein generating the security information comprises:

obtaining, when the virus software determined by the latest virus software data comprises the software in the local software list, the software in the local software list comprised in the virus software determined by the latest virus software data; and generating virus software prompt information, the virus software prompt information referenced to prompt the obtained software is virus software.

14. The server according to claim 11, wherein the mobile terminal information comprises software setting information of the mobile terminal, and the software setting information represents allowable software behavior allowed by a user;

the security data comprises software dangerous behavior data, the software dangerous behavior data referenced to identify a dangerous software behavior;

the security information comprises dangerous behavior prompt information referenced to prompt the dangerous software behavior; and wherein determining whether the existing security risk exists in the mobile terminal comprises:

determining the software behavior monitored on the mobile device matches the dangerous software behavior, and the dangerous software behavior is represented by the software setting information as a behavior that is of a corresponding software and that is allowed by the user, and is represented by the software dangerous behavior data as a dangerous behavior of the corresponding software; and wherein generating the security information comprises:

obtaining the same behavior corresponding to the same software; and generating dangerous behavior prompt information for prompting that the obtained behavior corresponding to the software is a dangerous behavior.

* * * * *